United States Patent
Kim et al.

(10) Patent No.: US 9,606,406 B2
(45) Date of Patent: Mar. 28, 2017

(54) LIQUID CRYSTAL DISPLAY

(71) Applicant: Samsung Display Co., Ltd, Yongin-si, Gyeonggi-do (KR)

(72) Inventors: Su-Jeong Kim, Seoul (KR); Ki-Chul Shin, Asan-si (KR); Hoon Kim, Ansan-si (KR); Hyung-Guel Kim, Seongnam-si (KR); Joo-Seok Yeom, Seoul (KR); Jae-Jin Song, Hwaseong-si (KR); Ho-Kil Oh, Asan-si (KR); Yoon-Jang Kim, Seoul (KR); Jae-Hoon Jung, Incheon (KR); Kwang-Chul Jung, Seongnam-si (KR)

(73) Assignee: Samsung Display Co., Ltd. (KR)

(*) Notice: Subject to any disclaimer, the term of this patent is extended or adjusted under 35 U.S.C. 154(b) by 0 days.

(21) Appl. No.: 15/151,699

(22) Filed: May 11, 2016

(65) Prior Publication Data
US 2016/0252795 A1    Sep. 1, 2016

Related U.S. Application Data

(63) Continuation of application No. 14/802,778, filed on Jul. 17, 2015, now Pat. No. 9,341,907, which is a (Continued)

(30) Foreign Application Priority Data

Oct. 29, 2010    (KR) .................... 10-2010-0106852

(51) Int. Cl.
*G02F 1/136*    (2006.01)
*G02F 1/1362*    (2006.01)
(Continued)

(52) U.S. Cl.
CPC ...... *G02F 1/136286* (2013.01); *G02F 1/1368* (2013.01); *G02F 1/13624* (2013.01); (Continued)

(58) Field of Classification Search
CPC .................................................. G02F 1/1368
See application file for complete search history.

(56) References Cited

U.S. PATENT DOCUMENTS

| 5,828,430 A | 10/1998 | Nishida |
| 6,833,882 B2 | 12/2004 | Lee |

(Continued)

FOREIGN PATENT DOCUMENTS

| CN | 1932594 A | 3/2007 |
| CN | 101236345 A | 8/2008 |

(Continued)

OTHER PUBLICATIONS

European Search Report corresponding to EP Application No. 11156369, dated Dec. 9, 2011, 7 pages.

*Primary Examiner* — Timothy L Rude
(74) *Attorney, Agent, or Firm* — Innovation Counsel LLP

(57) ABSTRACT

A liquid crystal display includes: a first substrate, a second substrate facing the first substrate, a liquid crystal layer interposed between the first substrate and the second substrate and including liquid crystal molecules, a gate line positioned on the first substrate, a data line positioned on the first substrate and crossing the gate line, a first thin film transistor and a second thin film transistor connected to the gate line and the data line, a third thin film transistor connected to the gate line and the second thin film transistor, a reference voltage line connected to the third thin film transistor, and a pixel electrode including a first subpixel electrode connected to the first thin film transistor and a second subpixel electrode connected to the second thin film transistor.

30 Claims, 21 Drawing Sheets

Related U.S. Application Data continuation of application No. 13/029,968, filed on Feb. 17, 2011, now Pat. No. 9,087,490.

(51) Int. Cl.
*G02F 1/1368* (2006.01)
*G02F 1/1343* (2006.01)
*G09G 3/36* (2006.01)

(52) U.S. Cl.
CPC .. *G02F 1/134336* (2013.01); *G02F 1/136209* (2013.01); *G09G 3/3648* (2013.01); *G02F 2001/134345* (2013.01); *G02F 2001/136218* (2013.01); *G09G 2300/0447* (2013.01); *G09G 2320/028* (2013.01)

(56) References Cited

U.S. PATENT DOCUMENTS

| | | | |
|---|---|---|---|
| 7,420,641 B2 | 9/2008 | Lee et al. | |
| 7,683,979 B2 | 3/2010 | Wang et al. | |
| 7,777,820 B2 | 8/2010 | Kim | |
| 8,803,855 B2 | 8/2014 | Goh et al. | |
| 9,007,284 B2 | 4/2015 | Sakurai | |
| 2002/0158993 A1 | 10/2002 | Murai | |
| 2004/0189571 A1 | 9/2004 | Yo | |
| 2006/0139541 A1 | 6/2006 | Yamaguchi et al. | |
| 2006/0158575 A1* | 7/2006 | Shin | G02F 1/134309 349/38 |
| 2007/0120797 A1 | 5/2007 | Lin et al. | |
| 2008/0024409 A1 | 1/2008 | Tomizawa et al. | |
| 2008/0237479 A1 | 10/2008 | Iwakiri | |
| 2009/0040413 A1 | 2/2009 | Chen et al. | |
| 2009/0102773 A1 | 4/2009 | Um et al. | |
| 2009/0174836 A1 | 7/2009 | Yoo et al. | |
| 2010/0309296 A1 | 12/2010 | Harrold et al. | |
| 2011/0096282 A1 | 4/2011 | Cho et al. | |
| 2011/0273653 A1 | 11/2011 | Yoshida et al. | |
| 2012/0081626 A1 | 4/2012 | Itoh et al. | |

FOREIGN PATENT DOCUMENTS

| | | |
|---|---|---|
| JP | 2000-310787 | 11/2000 |
| JP | 2003-273365 | 9/2003 |
| JP | 2006-106062 A | 4/2006 |
| JP | 2006-133577 A | 5/2006 |
| JP | 2006-189610 | 7/2006 |
| JP | 2007-156429 | 6/2007 |
| JP | 2007-316641 | 12/2007 |
| JP | 2008-065334 A | 3/2008 |
| JP | 2008-287026 | 11/2008 |
| JP | 2009-003434 A | 1/2009 |
| JP | 2009-181121 | 8/2009 |
| JP | 2010-060967 | 3/2010 |
| KR | 1997-0067069 A | 10/1997 |
| KR | 1020000014673 A | 10/1997 |
| KR | 1020090072783 A | 7/2009 |
| KR | 1020100000682 A | 1/2010 |
| WO | 2010/092706 A1 | 8/2010 |

* cited by examiner

LIQUID CRYSTAL DISPLAY

CROSS-REFERENCE TO RELATED APPLICATION

This application is a continuation application of U.S. patent application Ser. No. 14/802,778 filed on Jul. 17, 2015, which is a continuation application of U.S. patent application Ser. No. 13/029,968 filed on Feb. 17, 2011, which claims priority to Korean Patent Application No. 10-2010-0106852 filed on Oct. 29, 2010 in the Korean Intellectual Property Office (KIPO), and all the benefits accruing therefrom under 35 U.S.C. §119, the contents of the prior applications being herein incorporated by reference.

BACKGROUND (a) Field of Disclosure

The present disclosure of invention relates to a liquid crystal display. The present disclosure relates more specifically to structures, layouts and operations of repeated pixel units that have plural subpixel electrodes.

(b) Description of Related Technology

A liquid crystal display (LCD) device typically includes two spaced apart display panels, where a plurality of first field generating electrodes such as pixel electrodes are formed on a first of the panels, where a second field generating electrode such as a common electrode is formed on a second of the panels, and where a liquid crystal material layer is interposed between the first and second panels.

When actuated by appropriate drive electronics, the liquid crystal display device generates an electric field through the liquid crystal material layer due to application of a voltage across the first and second field generating electrodes. The generated electric field operates to determine orientations of liquid crystal molecules of the liquid crystal material layer and to thus control polarizations of incident light rays, thereby causing display of an image to a viewer who views the LCD affected light rays from a head on facing position relative to the display screen, or optionally from a side viewing position.

Further, the liquid crystal display also includes at least one switching element connected to each respective pixel electrode and a plurality of signal lines such as gate lines and data lines for applying the voltage to the pixel electrode by controlling the switching element.

Among various liquid crystal display devices, there are those that operate in a vertically aligned mode wherein the longer axes of the liquid crystal molecules are automatically arranged vertically with respect to a display panel while the electric field is not applied. Such has a relatively high contrast ratio and a wide reference viewing angle, and thus it is widely used.

However, the vertically aligned mode liquid crystal display device generally has low side visibility as compared with frontal viewing visibility. Therefore, there is sometimes provided a method that uses differing transmittances of light rays by dividing one pixel into two subpixels and controlling the voltages of two subpixels to be different from each other. Controlling the specific relationship between the different subpixel voltages can be a problem.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

The present disclosure of invention provides a liquid crystal display device having advantages of increased side transmittance and improved side visibility as compared to earlier LCD devices.

An exemplary embodiment in accordance with the present disclosure of invention provides a liquid crystal display including: a first substrate, a second substrate facing the first substrate, a liquid crystal layer interposed between the first substrate and the second substrate and including liquid crystal molecules, a gate line disposed on the first substrate, a data line disposed on the first substrate and crossing the gate line, a first thin film transistor and a second thin film transistor connected to the gate line and the data line, a third thin film transistor connected to the gate line and the second thin film transistor, a reference voltage line connected to the third thin film transistor, and a pixel electrode including a first subpixel electrode connected to the first thin film transistor and a second subpixel electrode connected to the second thin film transistor.

An output terminal of the second thin film transistor may be connected to the second subpixel electrode and an input terminal of the third thin film transistor.

a voltage applied to the second subpixel electrode may be lower than a voltage applied to the first subpixel electrode.

an area of the second subpixel electrode may be equal to or larger than an area of the first subpixel electrode.

A ratio of the area of the first subpixel electrode and the area of the second subpixel electrode may be in the range of about 1:1 to about 1:2.

When a ratio of a channel width and a channel length of the second thin film transistor is called a first channel ratio and a ratio of a channel width and a channel length of the third thin film transistor is called a second channel ratio, a percentage of the first channel ratio with respect to the sum of the first channel ratio and the second channel ratio may be in the range of about 70% to 80% in one embodiment.

The liquid crystal display may further include a common electrode positioned on the second substrate, wherein the magnitude of a reference voltage applied through the reference voltage line may have a level higher than that of a common voltage applied to the common electrode.

The reference voltage may be in the range of about 8V to 11V and the common voltage is about 7V.

The reference voltage may include a swing signal.

The reference voltage may include a signal having a duty ratio which is swung in the range of about 50% to 80%.

The pixel electrode may include a first side parallel to the gate line and a second side parallel to the data line, wherein a length of the first side may be longer than that of the second side.

The first subpixel electrode and the second subpixel electrode may include a cross-shaped stem having a horizontal stem and a vertical stem crossing the horizontal stem and a plurality of minute branches extending from the cross-shaped stem.

The first subpixel electrode and the second subpixel electrode may include a plurality of subregions having the plurality of minute branches extended toward different directions from the cross-shaped stem.

The reference voltage line may include two vertical portions parallel to the data line and a horizontal portion connecting the vertical portions with each other.

The vertical portion of the reference voltage line may be disposed between the pixel electrode and the data line and the horizontal portion of the reference voltage line may be disposed between the pixel electrode and the gate line.

The liquid crystal display may further include a light blocking unit disposed below the vertical portion of the reference voltage line and disposed on the same layer as the gate line.

The liquid crystal display may further include a shielding electrode disposed on the same layer as the pixel electrode and overlapping the gate line.

The reference voltage line may extend along an extending direction of the vertical stem and overlaps the vertical stem.

The reference voltage line may comprise an output terminal of the third thin film transistor.

The reference voltage line may be disposed at a same layer as the data line.

The liquid crystal display may further include a common electrode disposed on the second substrate, wherein each of the first subpixel electrode and the second subpixel electrode may include a first cutout, the common electrode may include a second cutout, and the first cutout and the second cutout may arrange alternately.

The pixel electrode may include a first side parallel to the gate line and a second side parallel to the data line, wherein a length of the second side may be longer than that of the first side.

The gate line may transfer a gate signal and gate signals applied to control terminals of the first thin film transistor, the second thin film transistor, and the third thin film transistor may be simultaneously transferred.

The liquid crystal molecules may be vertically aligned while an electric field is not applied.

The liquid crystal display may further include a shielding electrode line disposed along a direction in which the data line is extended, wherein the shielding electrode line may include a shielding electrode protruded to overlap the gate line.

The shielding electrode may be separated from the second subpixel electrode.

Therefore, according to exemplary embodiments of the present invention, it is possible to increase transmittance and improve visibility of the liquid crystal display by controlling areas of a high subpixel and a low subpixel and sizes of a divided voltage switching element and a divided reference voltage.

Other aspects of the present teachings will become apparent from the below detailed description.

BRIEF DESCRIPTION OF THE DRAWINGS

FIG. 6 is a cross-sectional view taken along line VI-VI' of FIG. 5.

DETAILED DESCRIPTION

Figure 1:
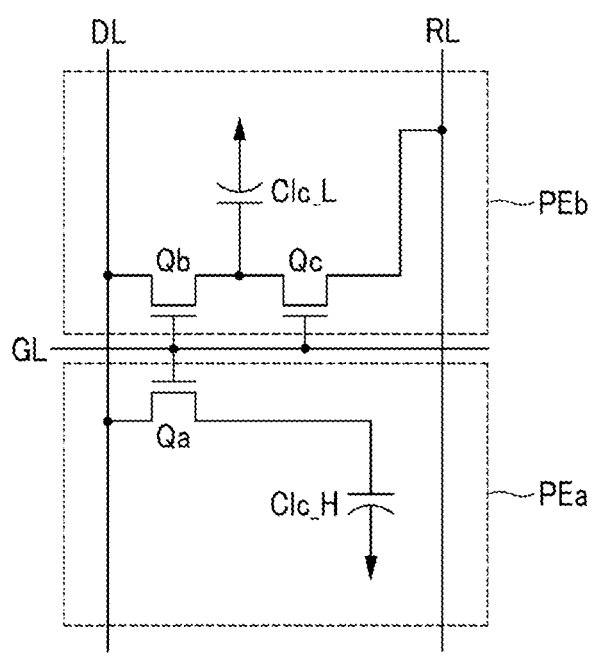
FIG. 1 is an equivalent circuit diagram for one pixel of a liquid crystal display according to a first exemplary embodiment.

The present disclosure of invention will be described more fully hereinafter with reference to the accompanying drawings, in which exemplary embodiments in accordance with the present disclosure are shown.

As those skilled in the art should realize in light of the present disclosure, the described embodiments may be modified in various different ways, all without departing from the spirit or scope of the present teachings.

In the drawings, the thickness of layers, films, panels, regions, etc., are generally exaggerated for clarity.

In addition, in the case of when the layer is mentioned to be present "on" the other layer or substrate, it may be directly formed on the other layer or substrate or a third layer may be interposed between them.

Throughout the specification, like reference numerals refer to like elements.

Hereinafter, in a liquid crystal display according to a first exemplary embodiment, a corresponding layout (substantially to scale) and a driving method of a signal line and of a pixel will be described with reference to FIGS. 1 and 2.

FIG. 1 is an equivalent circuit diagram for one pixel of a liquid crystal display according to the first embodiment.

Figure 2:
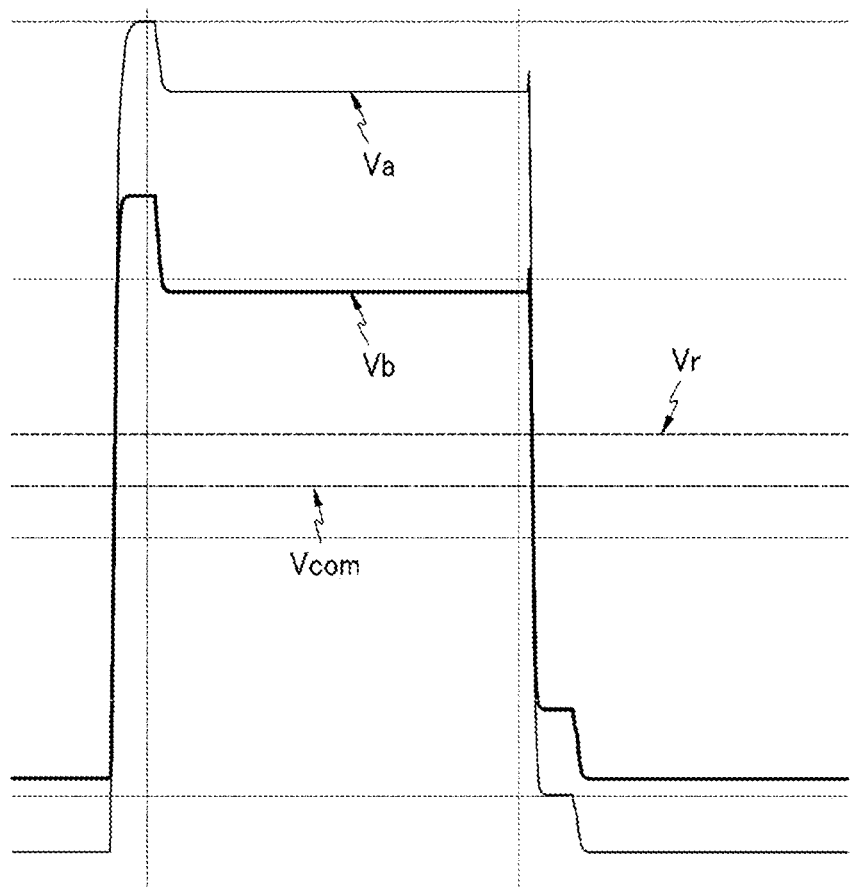
FIG. 2 is a waveform diagram of a signal applied to a pixel of a liquid crystal display according to the first exemplary embodiment.

FIG. 2 is a waveform diagram of a signal applied to a pixel of a liquid crystal display according to an exemplary embodiment of the present disclosure.

Referring to FIG. 1, in a first liquid crystal display device according to a first exemplary embodiment, a given one pixel PX that is representative of repeated such pixels, includes a plurality of signal lines passing therethrough or alongside thereof, including a gate line GL provided for conveying a gate signal to gates of plural transistors within the pixel PX, a data line DL provided for transferring a data signal to plural ones of transistors within the pixel PX, and a reference voltage line RL provided for transferring a voltage-dividing reference voltage, where the plural transistors within the pixel PX include a first switching element Qa, a second switching element Qb, and a third switching element Qc. The first through third switching elements are connected as shown to the plurality of signal lines, and further to a first liquid crystal capacitor ClcH defined by a first subpixel PEa and to a second liquid crystal capacitor ClcL defined by a first subpixel PEb of the pixel unit PX.

More specifically, the first through third switching elements, Qa-Qc each have their respective gates connected to the passing through gate line GL, the first and second switching elements, Qa and Qb are further connected to the corresponding data line DL of the pixel PX while the third switching element Qc is connected to an output (drain) terminal of the second switching element Qb and also to the reference voltage line RL.

The first switching element Qa and the second switching element Qb are three-terminal field effect elements such as thin film MOSFET transistors and the insulated control terminals (gates) thereof are connected to the gate line GL. The source or input terminals of Qa and Qb are connected to the data line DL. The output terminal (drain) of the first switching element Qa is connected the first liquid crystal capacitor ClcH (also referenced as Clca occasionally herein). The output terminal (drain) of the second switching element Qb is connected to the second liquid crystal capacitor ClcL (also referenced as Clcb occasionally herein) and also to an input terminal (source) of the third switching element Qc.

The third switching element Qc is also the three-terminal element such as the thin film transistor and a control terminal thereof is connected to the gate line GL, the input terminal is connected to the second liquid crystal capacitor Clcb, and an output terminal thereof is connected to the reference voltage line RL. In one embodiment, each of Qa, Qb and Qc is an NMOS device.

Referring to FIG. 2, when a gate turning on signal level, Von is applied to the gate line GL, each of the first switching element Qa, the second switching element Qb, and the third switching element Qc connected thereto is turned on (a channel region, not shown, within the corresponding transistor is switched into a conductive state).

Accordingly, a data voltage that is then applied to the data line DL is applied through the turned first and second transistors (Qa and Qb) for application to the first subpixel electrode PEa and to the second subpixel electrode PEb respective through the first and second switching elements, Qa and Qb.

If, in a first instance, the reference voltage Vr provided by the reference line RL were equal to the data voltage Vd applied at this time, then the data voltages developed at the first subpixel electrode PEa and the second subpixel electrode PEb may be charged to a same value.

However, according the exemplary embodiment of the present disclosure, the reference voltage Vr may be different than the supplied data voltage Vd and in such a case, the voltage developed on the second subpixel electrode PEb is a function of Vd as divided by a voltage divider formed by the series combination of the third switching element Qc as connected to the second switching element Qb in series.

Therefore, if the reference voltage Vr is less than the data line voltage Vd, then the divider produced voltage, Vb which develops on the second subpixel electrode PEb will be smaller than the voltage Va which develops on the first subpixel electrode PEa in response to the supplied data line voltage Vd.

By adjusting the reference voltage Vr as appropriate, the reduced voltage that is charged into the second liquid crystal capacitor Clcb can be made to be approximately equal to and offset plus a divided version (Rc/(Rb+Rc)) of the voltage Va which develops on the first liquid crystal capacitor Clca.

Since the voltage charged in the first liquid crystal capacitor Clca and the voltage charged in the second liquid crystal capacitor Clcb are thereby made different from each other, tilt angles of liquid crystal molecules influenced by the first subpixel can be made to be different from tilt angles of liquid crystal molecules influenced by the second subpixel, and as a result, front versus side visibilities and/or luminances of the respective subpixels can be made different from each other.

Therefore, when the voltage charged in the first liquid crystal capacitor Clca and the voltage charged in the second liquid crystal capacitor Clcb are appropriately adjusted, an image viewed from the lateral side can be adjusted to be relatively close to an image viewed from the front, thereby improving side visibility to correspond closely with front visibility. More specifically, assuming the drain-to-source resistance of transistor Qc is Rc when the transistor is turned on and assuming the drain-to-source resistance of transistor Qb is Rb when the transistor is turned on, the voltage, Vb which develops on the second subpixel electrode PEb can be estimated as: $Vb=(Rc/(Rb+Rc))*(Vd-Vr)$, where Vd is the applied data line voltage. The product term, $Vr*(Rc/(Rb+Rc))$ arising from the latter equation can be called a reference constant E, whereby the latter equation simplifies to:

$$Vb=(Rc/(Rb+Rc))*Vd-E; \text{ where } E \text{ is a function of } Vr.$$

Thus, by properly adjusting the ratio (Rc/(Rb+Rc)) and the offset vale, E; the developed value of the secondary voltage, Vb which develops on the second subpixel electrode PEb can be controlled as a desired linear function of the primary voltage Va which develops on the first liquid crystal capacitor Clca.

Hereinafter, a structure of the liquid crystal display according to one exemplary embodiment shown in FIG. 1 will be described with reference to FIGS. 3 and 4.

Figure 3:
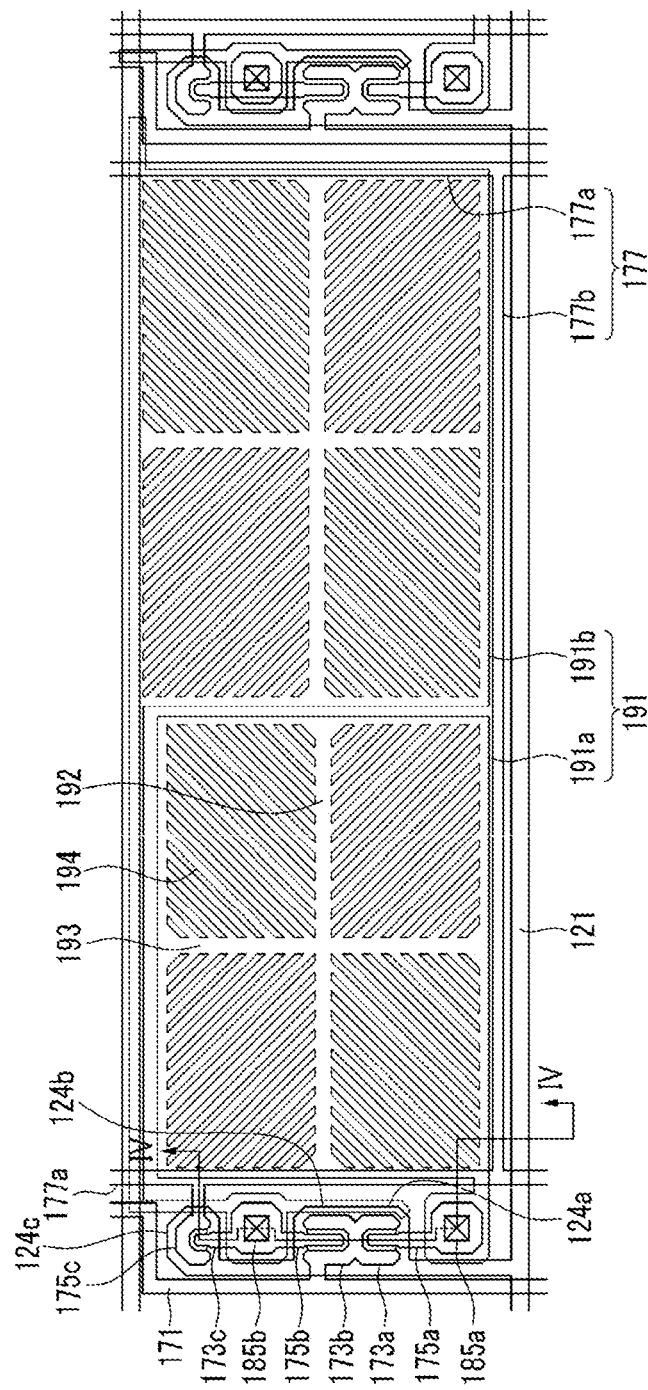
FIG. 3 is a layout view for one pixel of the liquid crystal display schematically represented in FIG. 1.

FIG. 3 is a layout view for one exemplary pixel cell among alike and immediately adjacent and repeated cells of a liquid crystal display corresponding to FIG. 1. Part of a next adjacent cell to the right is also shown.

Figure 4:
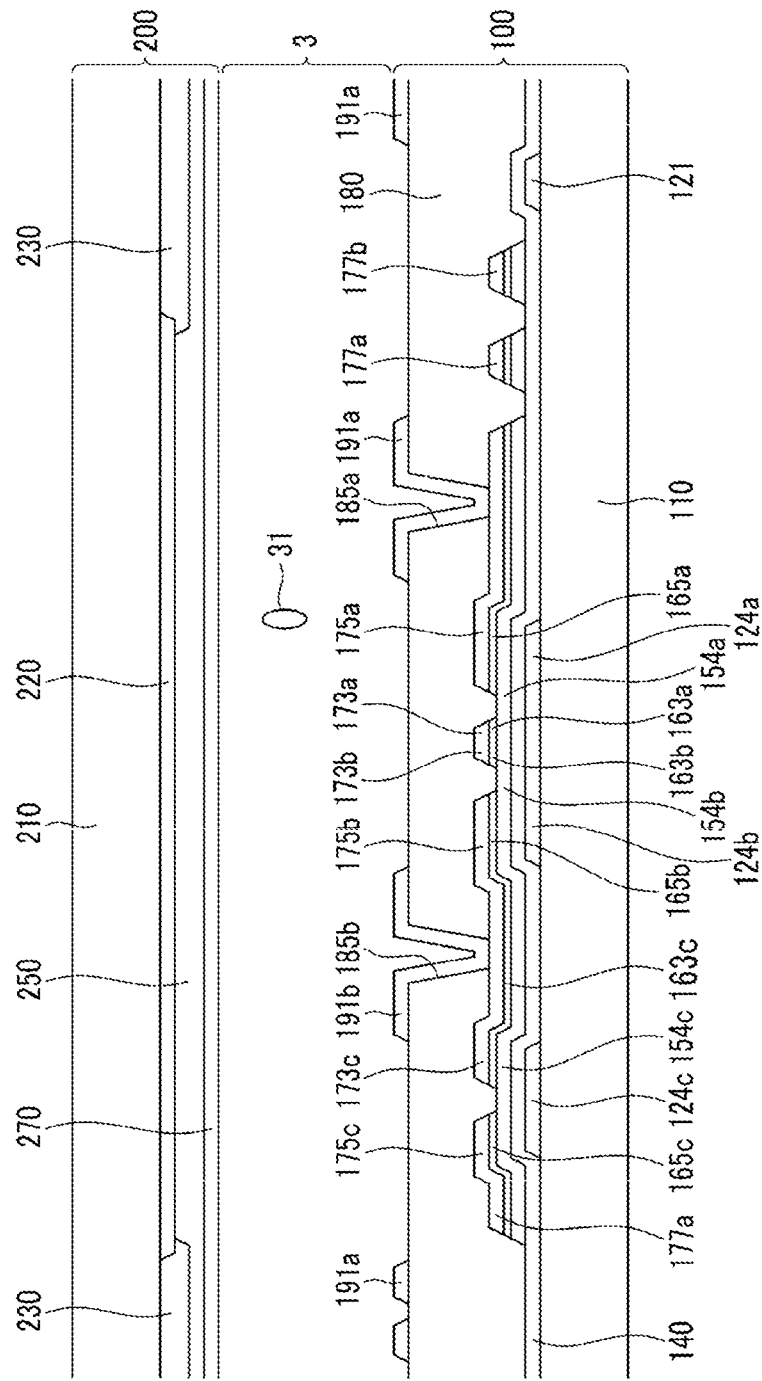
FIG. 4 is a cross-sectional view taken along line IV-IV' of FIG. 3.

FIG. 4 is a cross-sectional view taken along line IV-IV' of FIG. 3.

Referring to FIGS. 3 and 4, the liquid crystal display according to this exemplary first embodiment includes a lower display panel 100 and an upper display panel 200 that are spaced apart in facing relation with each other, where a liquid crystal material layer 3 is interposed between the two display panels 100 and 200, and where a pair of polarizer plates or sheets (not shown) may be attached or otherwise provided on or adjacent to the outer surfaces of the illustrated display panels 100 and 200.

First, a structure of a repeated cell in the lower display panel 100 will be described in more detail.

A gate line 121 of the repeated cell is positioned directly on an insulation substrate 110 made of a light-passing insulative material such as transparent glass or plastic.

The gate line 121 extends laterally through the illustrated cell to thereby connect gate electrodes of transistors in left side-area of the full shown cell to gate electrodes of transistors in left side-area of the next adjacent cell (only partly shown). The gate line 121 also extends vertically up into the left side-areas of the respective cells. The gate line 121 has branches extending contiguously therefrom, including a first gate electrode 124a, a second gate electrode 124b, and a third gate electrode 124c which form respective parts of first through third transistors Qa, Qb and Qc in each left side-area of each respective cell. At one or both lateral ends of the gate line 121 there may be provided wide end portions (not shown) for connecting to other interconnect layers of the circuit and/or to external driving circuits.

A gate insulating layer 140 is positioned on the gate line 121.

A first semiconductive region 154a, a second semiconductive region 154b, and a third semiconductive region 154c are positioned on the gate insulating layer 140.

A plurality of ohmic contacts 163a, 165a, 163b, 165b, 163c, and 165c are positioned on the first semiconductive region 154a, the second semiconductive region 154b, and the third semiconductive region 154c.

A data line 171 extends vertically through the left side-area of the fully illustrated cell on the left. The first cell's data line 171 has a plurality of branches extending contiguously therefrom, including a first source electrode 173a a second source electrode 173b and data conductors 173c, 175a, and 175b. A reference voltage line 177 also extends vertically through the left side-area of the fully illustrated first cell. The reference voltage line 177 has a branch extending contiguously therefrom, namely, third drain electrode 175c. Corresponding portions of the data line 171 and the reference voltage line 177 are positioned on the ohmic contacts 163a, 165a, 163b, 165b, 163c, and 165c and over the gate insulating layer 140.

The data conductors and the semiconductive regions and the ohmic contacts positioned below the data conductors may be respectively simultaneously formed by using one mask for etching numerous ones of openings through them (e.g., down to the gate insulating layer 140).

The data line 171 may include at one or both of its terminal ends, respective wide end regions (not shown) for connecting with another interconnect layer and/or external driving circuits.

In the illustrated embodiment, the reference voltage line 177 has a giant H-shape in that it includes two vertical portions 177a extending parallel to the data line 171 (one vertical stem of the big H being in the left side-area of the first cell and the other being in the left side-area of the second, only partially-shown cell) and a long horizontal portion 177b connecting both of the vertical portions 177a of the respective left and right side-areas to each other.

A signal flowing into the reference voltage line 177 may be prevented from being delayed by the horizontal connecting both of the vertical portions 177a of the reference voltage line 177 by means of the laterally extending horizontal portion 177b.

One of the two vertical portions 177a of the reference voltage line 177 is positioned between the first illustrated subpixel electrode 191a and the data line 171 and it connects with the third drain electrode 175c of respective transistor Qc.

The horizontal portion 177b of the reference voltage line 177 is positioned to extend under the first cell's two subpixel electrodes, 191a-191b and above the cells' gate line 121 so as to connect to the side-area of the next adjacent cell.

In the case where the reference voltage line 177 carries a steady DC reference voltage and acts as an AC equivalent ground, its H-structure may serve as an AC partition wall that reduces signal interference between the charge stored on the pixel electrode 191 and the data lines 171 that run nearby but carry AC signals for charging one row of pixels after the next with different pixel electrode voltages. Also the AC-wise grounded H-structure of the reference voltage line 177 reduces noise coupling from the adjacent gate line 121 to the cells subpixel electrodes 191a-191b.

The first gate electrode 124a, the first source electrode 173a, and the first drain electrode 175a form the first thin film transistor Qa together with the first semiconductor 154a and a channel of the thin film transistor is formed on the semiconductor 154a between the first source electrode 173a and the first drain electrode 175a.

Similarly, the second gate electrode 124b, the second source electrode 173b, and the second drain electrode 175b form the second thin film transistor Qb together with the second semiconductor 154b, a channel of the thin film transistor is formed on the semiconductor 154b between the second source electrode 173b and the second drain electrode 175b, the third gate electrode 124c, the third source electrode 173c, and the third drain electrode 175c form the third thin film transistor Qc together with the third semiconductor 154c, and a channel of the thin film transistor is formed on the semiconductor 154c between the third source electrode 173c and the third drain electrode 175c.

A passivation layer 180 is formed on the data conductors 171, 173c, 175a, 175b, 175c, and 177 and the exposed semiconductors 154a, 154b, and 154c.

The passivation layer 180 is made of an inorganic insulator such as silicon nitride and silicon oxide.

However, the passivation layer 180 may be made of an organic insulator and the top surface of the passivation layer 180 may be planarized.

The organic insulator may have photosensitivity and a dielectric constant of about 4.0 or less.

The passivation layer 180 may have a double-layer structure constituted by a lower inorganic layer and an upper organic layer so as to have excellent insulating characteristics and not to damage the exposed semiconductors 154a, 154b, and 154c.

A plurality of contact holes 185a and 185b exposing the first drain electrode 175a and the second drain electrode 175b are formed through the passivation layer 180.

A pixel electrode structure 191 including a first subpixel electrode 191a and a second subpixel electrode 191b are formed on the passivation layer 180.

The pixel electrode structure 191 may be made of a transparent conductive material such as ITO or IZO and/or reflective metal such as aluminum, silver, chromium or an alloy thereof.

The pixel electrode structure 191 includes a first side extending parallel to the gate line 121 and a second side extending parallel to the data line 171.

A length of the first side which parallels the gate line 121 is longer than that of the second side parallel to the data line 171, by approximately three times (a 3:1 aspect ratio)

Accordingly, the number of the pixel electrodes 191 positioned in each row is smaller, but the number of the pixel electrodes 191 positioned in each column is larger than the case that a horizontal side of the pixel-electrode structure is smaller than its vertical side.

Therefore, since the total number of the data lines 171 is decreased for a same number of subpixels, the number of IC chips for providing the data driver function may be decreased, thereby reducing the costs of material and manufacture.

Of course, with this approach the number of the gate lines 121 is increased, but since a gate-lines driver may be monolithically integrated on a liquid crystal display panel assembly together with the gate lines 121, as well as with the data lines 171, and the thin film transistors, the increase in number of digitally driven gate lines is not as problematic as when the analog signal outputting data line drivers are increased.

In addition, even if the gate-lines driver is instead mounted as a discrete IC chip type, the cost of the all-digital, gate lines driving IC chip is relatively cheap relative to the mixed mode, digital/analog data line driving IC's, such that it is advantageous to reduce the number of IC chips for the data-lines driver as compared to increasing the number of gate lines and their respective drivers.

The first subpixel electrode 191*a* and the second subpixel electrode 191*b* are adjacent to each other in a row direction of the cell, and in the illustrated embodiment they each in outline have a substantially quadrangular shape, and in their respective interiors they include counter-crossing stem regions or branches branching off from a main horizontal stem 192 and a main vertical stem 193 crossing therewith.

More specifically, the first subpixel electrode 191*a* and the second subpixel electrode 191*b* are divided into four subregions by the horizontal stem 192 and the vertical stem 193 and each subregion includes a plurality of inclined minute branches 194.

The second subpixel electrode 191*b* includes a portion that extends alongside of at least one side of the first subpixel electrode 191*a*.

One of the minute branches 194 of the first subpixel electrode 191*a* and the second subpixel electrode 191*b* obliquely extends toward the upper left side from the horizontal stem 192 or the vertical stem 193, and the other of the minute branches 194 obliquely extends toward the upper right side from the horizontal stem 192 or the vertical stem 193.

In addition, another minute branche 194 extends toward the lower left side from the horizontal stem 192 or the vertical stem 193, and the rest one of the minute branches 194 obliquely extends toward the lower right side from the horizontal stem 192 or the vertical stem 193.

Each of the minute branches 194 forms an angle of approximately 40 to 45 degrees with the gate line 121 or the horizontal stem 192.

Particularly, in the illustrated embodiment the minute branch 194 included in the first subpixel electrode 191*a* forms an angle of approximately 40 degrees with the horizontal stem 192 and the minute branch 194 included in the second subpixel electrode 191*b* forms an angle of approximately 45 degrees with the horizontal stem 192.

In addition, the minute branches 194 of adjacent two subregions may be perpendicular to each other.

Although not shown, the width of the minute branches 194 may be gradually widened as a function of distance so as to create varying domains for orienting the molecules of the local liquid crystal material.

The first subpixel electrode 191*a* and the second subpixel electrode 191*b* are physically and electrically connected with the first drain electrode 175*a* and the second drain electrode 175*b* through the contact holes 185*a* and 185*b*, respectively, and couple to the applied data line voltage Vd by way of the first drain electrode 175*a* and the second drain electrode 175*b* respectively.

Since the data line voltage Vd which applied substantially in full to the first subpixel electrode 191*a* is divided by the voltage divider formed by Qb and Qc, when the reference voltage Vr is less than the data line voltage Vd, the magnitude of the voltage Vb developed on the second subpixel electrode 191*b* is smaller than that of the voltage Va developed on the first subpixel electrode 191*a*. The direction that currents flow may be decided by a relation between magnitudes of the reference voltage Vr and the data line voltage Vd.

In one embodiment, the area of the second subpixel electrode 191*b* is larger than that of the first subpixel electrode 191*a* by a ratio in one embodiment that is greater than 1 and less than or equal to about 2.

Particularly, in the exemplary embodiment, it is preferable that the area of the second subpixel electrode 191*b* is between once to about 1.5 times larger than that of the first subpixel electrode 191*a* and thus the capacitance of the secondary liquid crystal capacitor ClcL is similarly greater than that of the first liquid crystal capacitor ClcH.

In addition, when a ratio of the width versus the length of a channel of the second switching element Qb is called a first channel ratio and a ratio of the width versus the length of a channel of the third switching element Qc is called a second channel ratio, then in one embodiment a percentage of the first channel ratio with respect to the sum of the first channel ratio plus the second channel ratio is approximately 60% to 95%. In other words, the first channel width ratio (of Qb) is greater than the second channel width ratio (of Qc). Stated conversely, the drain-to-source resistance Rc (of Qc) is greater than the drain-to-source resistance Rb (of Qb).

In the exemplary illustrated embodiment, considering both transmittance and side view visibility, when the area of the second subpixel electrode 191*b* is once to 1.25 times larger than that of the first subpixel electrode 191*a*, it is preferable that the percentage of the first channel ratio with respect to the sum of the first channel ratio and the second channel ratio is in the range of about 70% to 80%. But, the range of about 70% to 80% may be modified. In other words, the percentage of the first channel ratio with respect to the sum of the first channel ratio and the second channel ratio may be decreased for higher visibility or increased for higher transmittance.

Further, since a level of the voltage applied to the reference voltage line should be higher than that of a common voltage applied to the common electrode, it is preferable that a difference (Vr-Vcom) between absolute values thereof is about 1V to about 4V.

For example, when the common voltage Vcom is about 7V relative to system ground, it is preferable that the reference voltage Vr is about 8V to 11V.

Hereinafter, details of the upper display panel 200 will be described.

A light blocking member 220 is formed on the light-passing upper insulation substrate 210 which may be made of a transparent glass or plastic.

The light blocking member 220 is also called a black matrix and it blocks undesired light leakage from between areas controlled by pixel-electrodes.

Further, a plurality of color filters 230 are formed on the substrate 210 and the light blocking member 220.

The color filters 230 are mostly provided in respective opening regions surrounded by the light blocking member 220 and may be elongated along a column of pixel electrodes 191 so as to provide vertically striped RGB color filtering of the like.

Each of the color filters 230 may display one of primary colors such as three primary colors such as those of a red, a green and a blue.

However, each of the color filters 230 may display not only three primary colors of the red, the green, and the blue but one of a cyan, a magenta, a yellow, and a white based color.

At least one of the light blocking member 220 and the color filter 230 may be formed on the lower substrate 110.

A planarizing overcoat 250 may be formed on the color filter 230 and the light blocking member 220.

The overcoat 250 may be made of an insulating material and may prevent the color filters 230 from being exposed and may provide a planarized flat surface on which the common electrode 270 may be disposed.

The overcoat 250 may optionally be omitted.

The common electrode 270 may be formed on the overcoat 250.

Liquid crystal molecule aligning layers (not shown) are formed on both surfaces of the display panels 100 and 200 and may be vertical alignment layers.

Polarizers (not shown) may be provided on outer surfaces of the display panels 100 and 200, where polarization axes of two polarizers are perpendicular to each other and one polarization axis of them is preferably parallel to the elongation direction of the gate line 121.

In the reflective-only type liquid crystal display, the lower of the two polarizers may be omitted.

The liquid crystal layer 3 is interposed between two display panels 100 and 200, and the liquid crystal layer 3 includes liquid crystal molecules 31 having negative dielectric anisotropy.

The liquid crystal molecules 31 of the liquid crystal layer 3 have a pretilt so that a long axis is substantially in parallel to a longitudinal direction of the minute branches of the first and the second subpixel electrodes 191a and 191b and may be aligned to be perpendicular to the surfaces of two display panels 100 and 200 while a driving electric field is not applied.

In addition, the liquid crystal layer 3 further includes alignment assistants including reactive mesogen and the liquid crystal molecules 31 have a pretilt so that a long axis is substantially in parallel to a longitudinal direction of the minute branches of the first and the second subpixel electrodes 191a and 191b due to the alignment assistants.

The first subpixel electrode 191a and the second subpixel electrode 191b, when they receive their corresponding voltages Va and Vb developed from a supplied data line voltage Vd respective generate electric fields extending to the common electrode 270 of the common electrode display panel 200 with the latter receiving the common voltage, thereby determining an orientation of the liquid crystal molecules in the liquid crystal layer 3 between the respective electrodes 191a, 191b, and 270.

As such, polarization of light passing through the liquid crystal layer 3 is changed according to the determined orientation of the liquid crystal molecules.

The first and second subpixel electrodes 191a and 191b and the common electrode 270 form liquid crystal capacitors Clca and Clcb to maintain the applied voltage even after the respective thin film transistors (Qa, Qb, Qc) are turned off by a turn-off voltage Voff applied to the corresponding gate line 121.

At this time, sides of the minute branches 194 generate a horizontal field component perpendicular to the side of the minute branches 194 by distorting the electric field and tilt directions of the liquid crystal molecules 31 are determined as a direction determined by the horizontal field component.

Accordingly, the liquid crystal molecules 31 are first tilted in a direction perpendicular to the sides of the minute branches 194.

However, since a direction of the horizontal component of the electric field is opposite by the adjacent sides of the minute branches 194 and a gap between the minute branches 194 is narrow, the liquid crystal molecules 31 to be tilted in a direction opposite to each other are tilted to be parallel to a longitudinal direction of the minute branches 194.

In the exemplary embodiment, since the number of longitudinal directions in which the minute branches 194 extend is four, the number of tilted directions of the liquid crystal molecules 31 is at least four.

As such, when the tilted directions of the liquid crystal molecules 31 are various, a reference viewing angle of the liquid crystal display is increased.

Hereinafter, display transmittance and lateral side visibility of the liquid crystal display according to an exemplary embodiment will be described with reference to experimental results of FIGS. 5 and 6.

Figure 5:
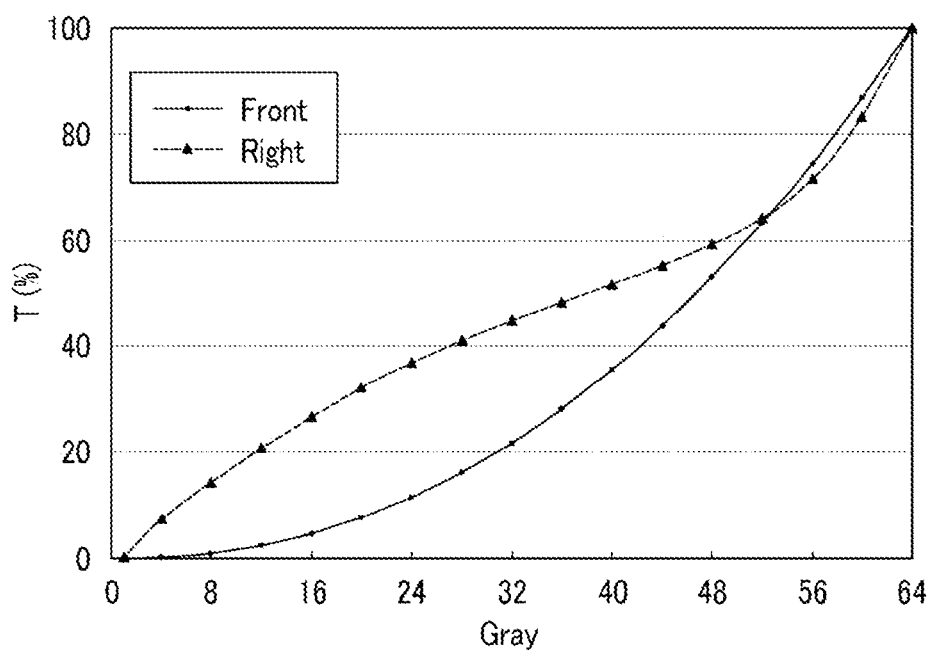
FIGS. 5 and 6 are graphs showing results of transmittance and side visibility of a liquid crystal display according to an experimental example of the embodiment of FIG. 3.
Figure 6:
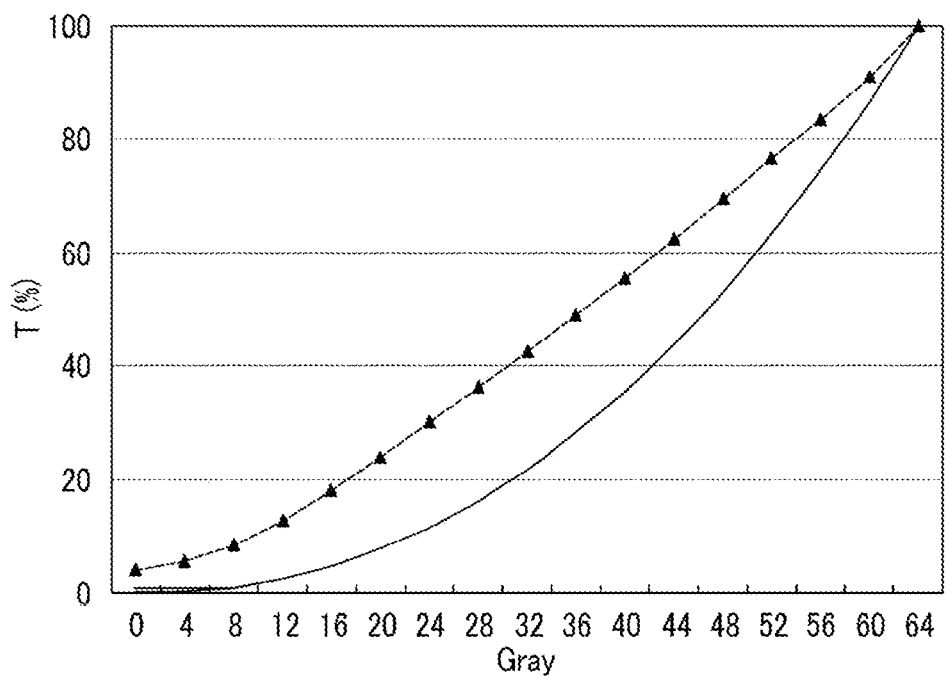

FIGS. 5 and 6 are graphs showing results of transmittance level (gray level) versus frontal and side visibility of a liquid crystal display according to an Experimental Example structured in accordance with the present disclosure of invention.

The first subpixel electrode and the second subpixel electrode described in FIGS. 1 to 4 may correspond to a high subpixel and a low subpixel to be described below, respectively.

In FIGS. 5 and 6, solid lines indicate transmittance according to a gray in viewing the liquid crystal display from the front and dotted lines with sample point triangles indicate transmittance versus the gray scale when viewing the liquid crystal display from a lateral side (the right side).

FIG. 5 shows the case when a same gray scale data voltage is applied without inducing a voltage difference (Va−Vb=0) between the high subpixel and the low subpixel in general. On the other hand, FIG. 6 shows the case of the liquid crystal display according to the exemplary embodiment of the present disclosure where a specific voltage difference (Va>Vb) is induced between the high subpixel and the low subpixel.

Referring to FIGS. 5 and 6, as compared with a general liquid crystal display that does not have differently charged subpixels, in the liquid crystal display according to the exemplary embodiment of FIG. 6, a graph of percent transmittance versus the gray scale and when viewing the liquid crystal display from a lateral side is substantially closer to the graph of transmittance versus the gray scale when viewing the liquid crystal display from the front, and in particular, the slope of transmittance versus gray level more closely mimics the slope of transmittance versus gray level in the lower portion of the gray scale (extending from 0 to 64 in the illustrated example).

In other words, in the liquid crystal display according to the exemplary embodiment of FIG. 6, mimicry in the lateral side view of what is seen in the frontal view is improved.

Hereinafter, display characteristics of the liquid crystal display according to further experimental example will be described in detail with reference to Table 1 and FIGS. 7 and 8.

Table 1 shows the display characteristic of the liquid crystal display according to the described experimental examples.

In the experimental examples, variations are made in an area ratio of the low subpixel to the high subpixel, a channel width of a first TFT, a channel width of a second TFT, and measurements are provided for transmittance of the liquid crystal display according to a channel ratio (a ratio of the channel width of the second TFT with respect with channel widths of the second TFT and the third TFT), a visibility index, and a voltage ratio of the high subpixel and the low subpixel and the measured results are shown the following Table 1.

Herein, it was estimated in a state that the channel lengths of Qa, Qb and Qc are the same.

TABLE 1

| Area ratio (high subpixel:low subpixel) | channel ratio (channel width of second TFT (µm)) | Transmittance (%) | Visibility index | Voltage ratio |
|---|---|---|---|---|
| 1:1.5 | 90 (5) | 5.14 | 0.297 | 0.82 |
|  | 80 (11) | 4.76 | — | 0.75 |
|  | 70 (19) | 4.61 | 0.24 | 0.71 |
|  | 60 (29) | 4.03 | 0.216 | 0.58 |
| 1:1.25 | 70 (17) | 4.92 | 0.279 | 0.72 |
|  | 80 (10) | 5.13 | 0.31 | 0.77 |
|  | 70 (17) | 4.90 | 0.279 | 0.72 |
|  | 60 (27) | 4.29 | — | 0.69 |
| 1:1.0 | 90 (4) | 5.51 | 0.315 | 0.80 |
|  | 80 (9) | 5.12 | — | 0.75 |
|  | 70 (15) | 5.01 | 0.316 | 0.71 |
|  | 60 (24) | 4.28 | 0.204 | 0.60 |
| 1:0.75 | 90 (3) | 5.45 | 0.346 | 0.77 |
|  | 80 (8) | 5.03 | 0.279 | 0.69 |
|  | 70 (13) | 4.88 | 0.347 | 0.65 |
|  | 60 (21) | 4.49 | 0.258 | 0.60 |

Referring to the Table 1, In the case where an area of the pixel electrode of the low subpixel is equal to or larger than an area of the pixel electrode of the high subpixel, as compared with the case where the area of the pixel electrode of the low subpixel is smaller than the area of the pixel electrode of the high subpixel, a desired value of the voltage ratio (Vb/Va) of the high subpixel and the low subpixel may be in the range of about 0.7 to about 0.8, for example.

In other words, when the area of the pixel electrode of the low subpixel is smaller than the area of the pixel electrode of the high subpixel, transmittance of the liquid crystal display may be increased, but it is difficult to acquire a voltage ratio (the voltage of the low subpixel: the voltage of the high subpixel) for controlling the lateral side visibility.

Further, when the area of the pixel electrode of the low subpixel is 1.5 times or more larger than the area of the pixel electrode of the high subpixel, the transmittance of the liquid crystal display may be decreased.

Accordingly, like the liquid crystal display according to the exemplary embodiment of the present invention, when the area of the pixel electrode of the low subpixel is equal to or 1.5 times or less larger than the area of the pixel electrode of the high subpixel, both the transmittance and the lateral side visibility of the liquid crystal display may be increased.

Referring back to Table 1, particularly, when the area ratio is in a range of about 1:1 to 1:1.25 and the channel ratio (ratio of the channel width of the second TFT with respect with channel widths of the second TFT and the third TFT) is in a range of about 70% to about 80%, the transmittance of the liquid crystal display is not decreased and the visibility index is decreased, thereby to improve the lateral side visibility.

Accordingly, like the liquid crystal display according to the exemplary embodiment of the present invention, when the ratio of the channel width of the second switching element Qb with respect to the sum of the channel widths of the second switching element Qb and the third switching element Qc is in a range of about 70% to 80%, the transmittance is not decreased and the lateral side visibility may be measurably improved.

Figure 7:
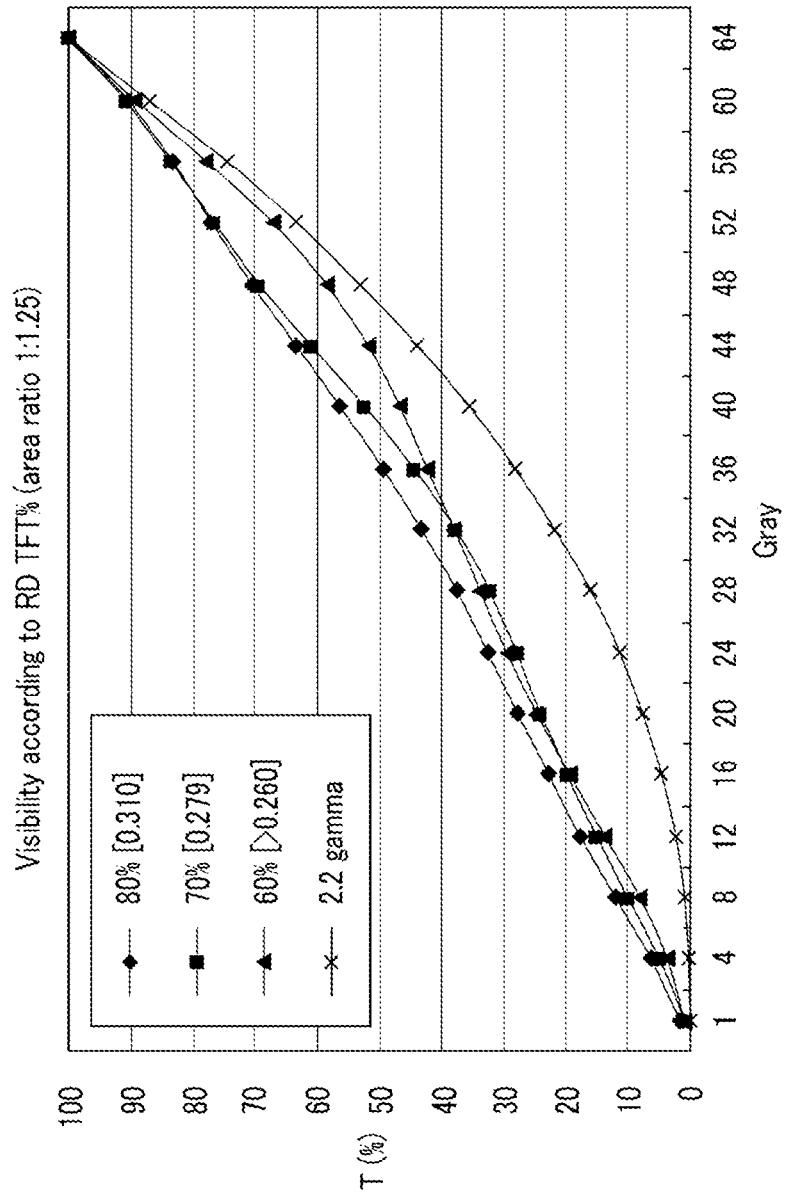
FIG. 7 is a graph showing variation in transmittance versus gray scale level for each of different sizes of divided voltage switching elements in the liquid crystal display according to exemplary embodiments.

FIG. 7 is a graph showing variation in transmittance according to a gray for each of sizes of the divided voltage switching elements in the liquid crystal display according to the exemplary embodiment of the present invention.

In detail, FIG. 7 shows variation in transmittance according to variation in voltage ratio of the low subpixel to the high subpixel when the area ratio of the high subpixel and the low subpixel is 1:1.25.

The illustrated 2.2 gamma curve shows transmittance according to a gray in viewing the liquid crystal display from the front side.

The rest of the curves show transmittance according to a gray in viewing the liquid crystal display from the lateral side.

Referring to FIG. 7, as the voltage ratio of the low subpixel to the high subpixel is increased, it is far away from the graph of the transmittance according to a gray in viewing the liquid crystal display from the front side and when the visibility index (gamma distortion index; GDI) is increased, the lateral side visibility is decreased.

Figure 8:
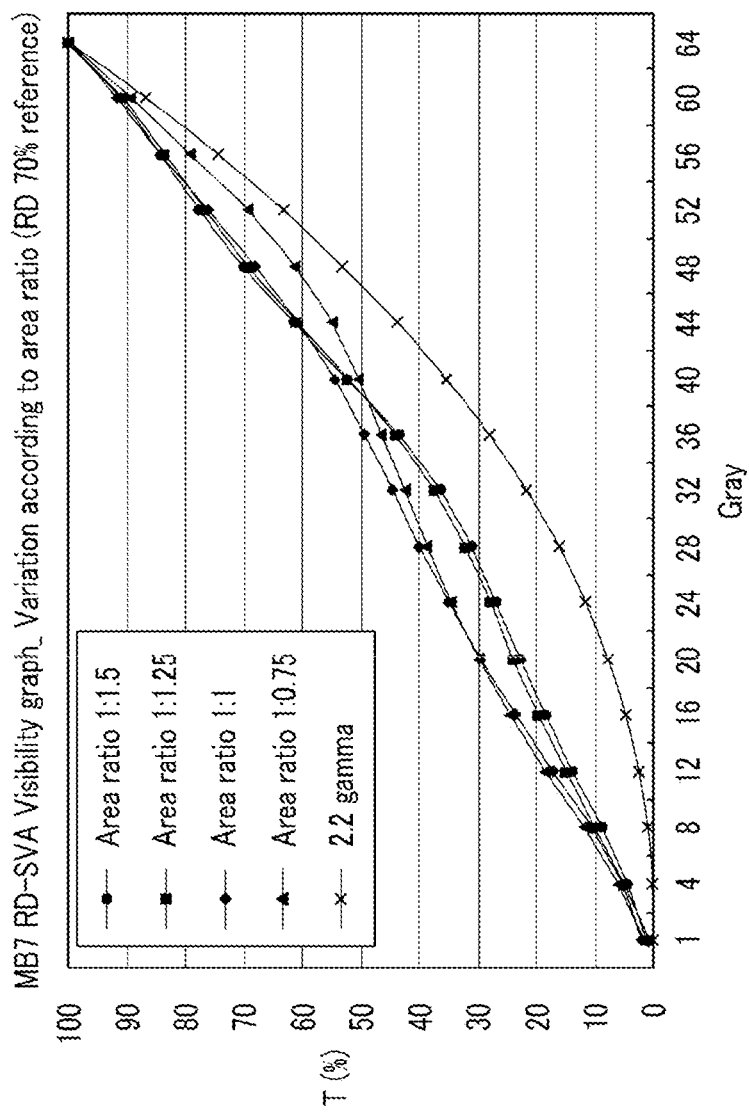
FIG. 8 is a graph showing the variation in transmittance versus gray level for each of different area ratios of high subpixels and low subpixels in the liquid crystal display according to exemplary embodiments.

FIG. 8 is a graph showing variation in transmittance according to a gray for each of area ratios of the low subpixel to the high subpixel in the liquid crystal display according to the tested exemplary embodiments.

In detail, FIG. 8 shows variation in transmittance according to an area ratio of the low subpixel to the high subpixel when the voltage ratio (Vb/Va) of the low subpixel to the high subpixel is 70%.

Referring to FIG. 8, as the area ratio of the low subpixel to the high subpixel is increased, it is closer to the graph of the transmittance according to a gray in viewing the liquid crystal display from the front side and when this is considered, the lateral side visibility is improved.

In particular, the effect is further increased at the low gray scale levels.

Hereinafter, referring to FIGS. 9 and 10, the variation in transmittance according to a gray will be described by further embodying different area ratios of the low subpixel to the high subpixel.

Figure 9:
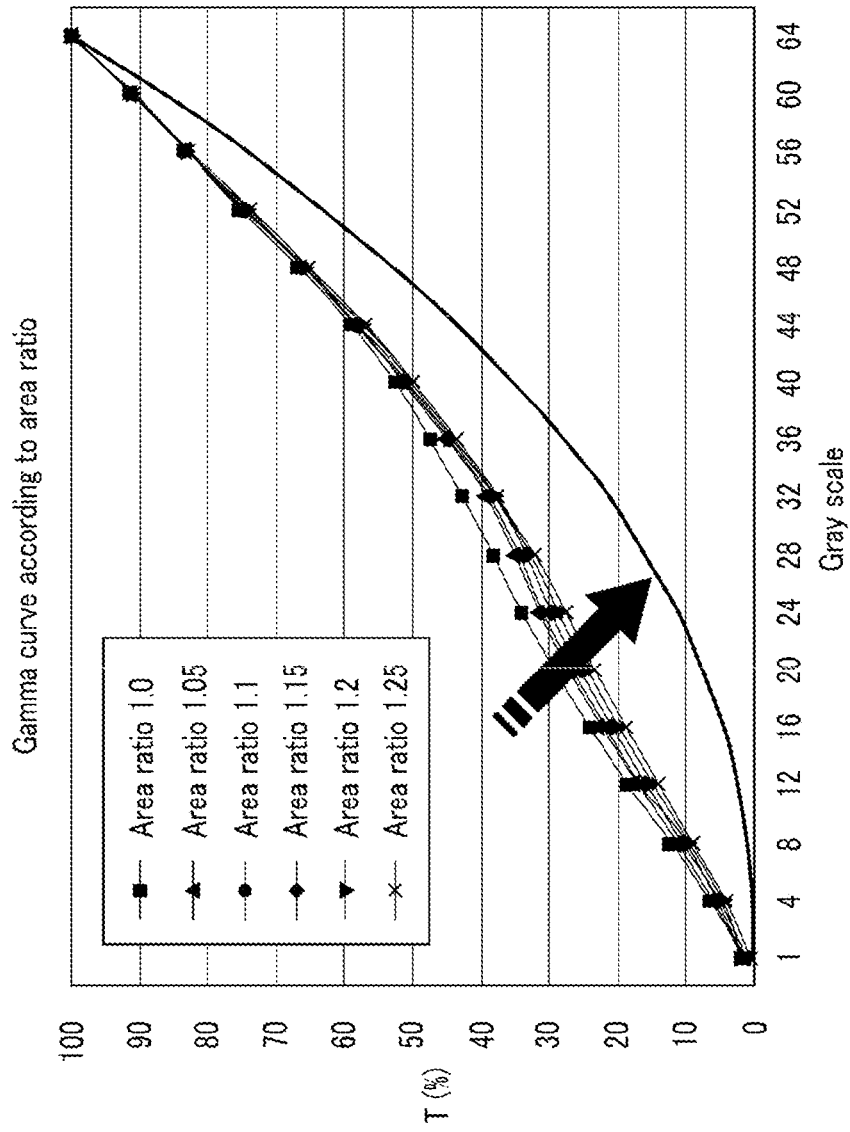
FIG. 9 is a graph showing the variation in transmittance versus gray level for each of different area ratios of the high subpixels and the low subpixels in the liquid crystal display according to exemplary embodiments.
Figure 10:
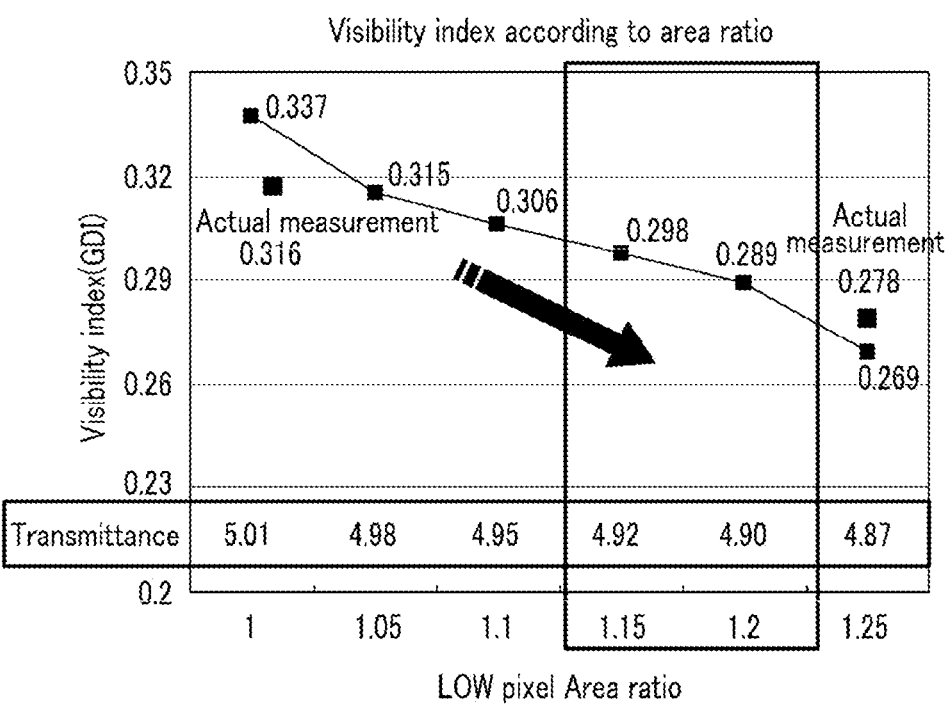
FIG. 10 is a graph showing a visibility index and transmittance according to different area ratios of the high subpixel and the low subpixel in the liquid crystal display according to exemplary embodiments.

FIG. 9 is a graph showing variation in transmittance according to a gray for each area ratio of the low subpixel to the high subpixel in the liquid crystal display according to the tested exemplary embodiments and FIG. 10 is a graph showing a visibility index and transmittance according to area ratio of the low subpixel to the high subpixel in the liquid crystal display according to the exemplary embodiments.

In detail, FIGS. 9 and 10 show the transmittance according to a gray and the visibility index according to the area ratio when the area ratio of the low subpixel to the high subpixel are 1, 1.05, 1.1, 1.15, 1.2, and 1.25 while the channel ratio is 70% and a data voltage of 14.7V is applied.

Referring to FIG. 9, when the area ratio is increased from 1 and becomes 1.25, it is closest to the graph of the transmittance according to a gray at the front view.

Referring to FIG. 10, as the area ratio is increased from 1 to 1.25, the visibility index is decreased and the transmittance is decreased.

Hereinafter, display characteristics of a liquid crystal display according to another experimental example will be described with reference to FIGS. 11 and 12.

Figure 11:
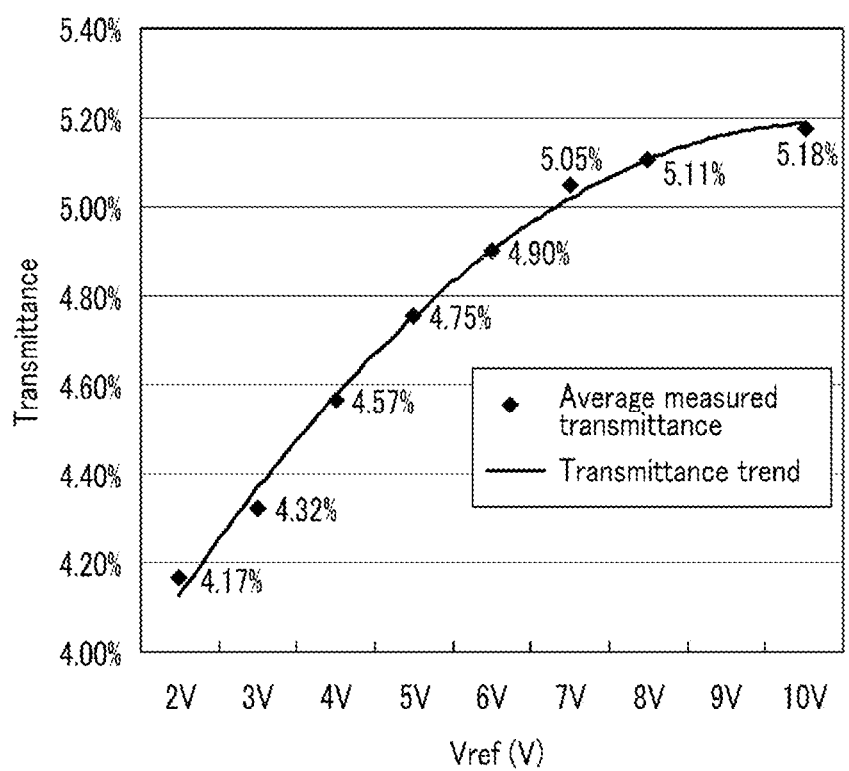
FIG. 11 is a graph showing variation in transmittance versus reference voltage in the liquid crystal display according to exemplary embodiment.
Figure 12:
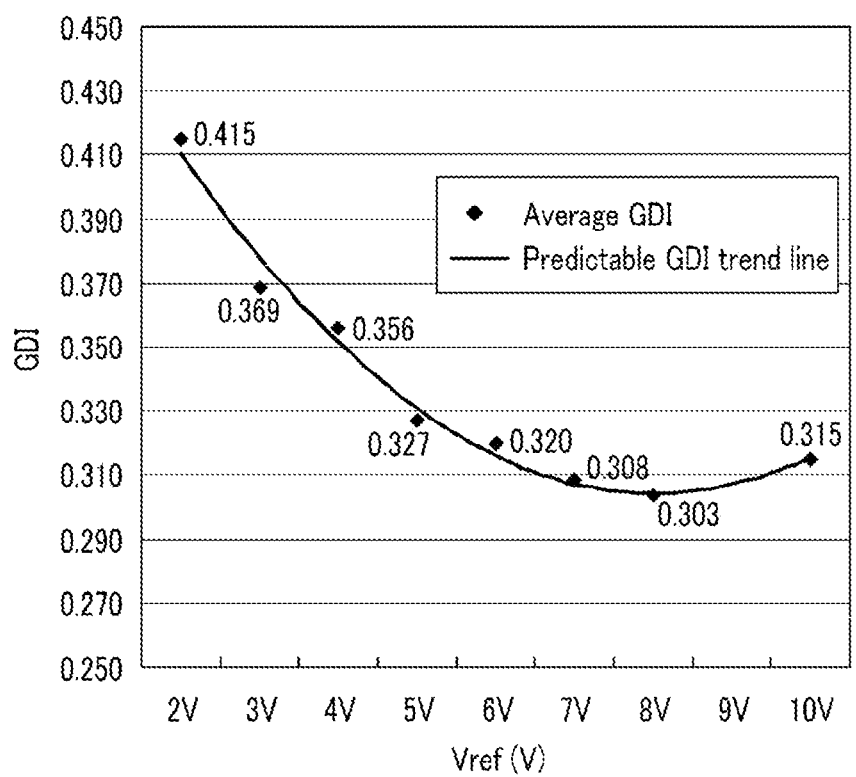
FIG. 12 is a graph showing variation in visibility index versus reference voltage in the liquid crystal display according to exemplary embodiments.

FIG. 11 shows variation in transmittance according to a reference voltage Vref in the liquid crystal display according to the tested exemplary embodiment and FIG. 12 shows variation in visibility index according to a reference voltage Vref in the liquid crystal display according to the exemplary embodiment.

Referring to FIGS. 11 and 12, as the reference voltage Vref is increased, the transmittance is increased and the visibility index is decreased.

This reason is that the voltage ratio (Vb/Va) of the low subpixel to the high subpixel is increased as the reference voltage Vref is increased.

Figure 13:
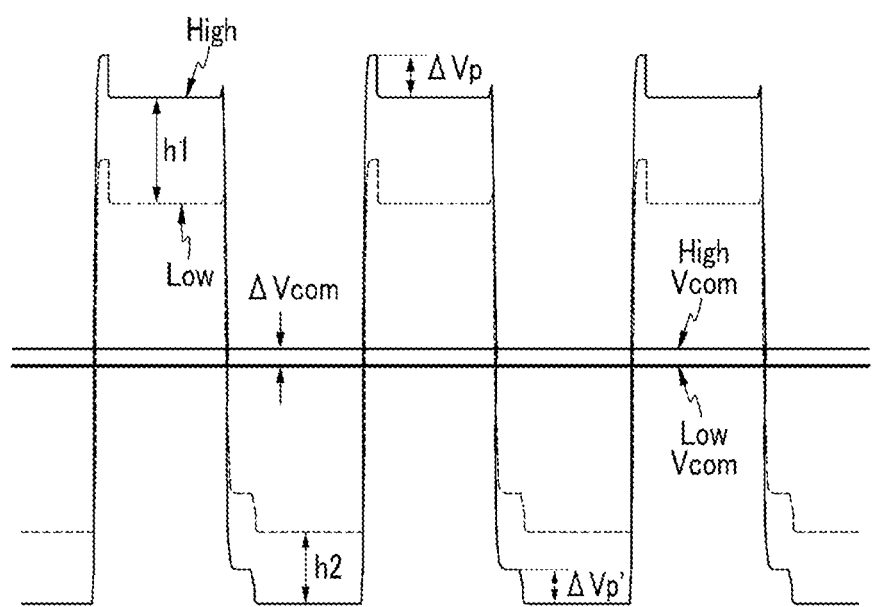
FIG. 13 is a graph showing distortion of a common voltage generated between the high subpixel and the low subpixel in the liquid crystal display according to exemplary embodiments.

FIG. 13 is a graph showing distortion of a common voltage generated between the high subpixel and the low subpixel in the liquid crystal display according to the exemplary embodiment.

In detail, FIG. 13 shows a voltage waveform (high) developed at the high subpixel and a voltage waveform (low) developed at the low subpixel.

In the liquid crystal display according to the exemplary embodiment, since the voltage (Vb) applied to the low subpixel is smaller than the voltage (Va) applied to the high subpixel, it swings with a small amplitude around the common voltage.

Herein, the common voltage is a voltage applied to the common electrode formed on the upper display panel.

As shown in FIG. 13, a difference h1 between a level of the high subpixel and a level of the low subpixel in a positive polarity mode is different from a difference h2 between a level of the high subpixel and a level of the low subpixel in a negative polarity mode.

The reason is that a kickback voltage of the low subpixel is larger than that of the high subpixel.

In detail, when the kickback voltage is increased, an amount of the voltage dropped in a positive polarity is different from an amount of the kickback voltage which the voltage is increased in a negative polarity.

As a result, since an optimal common voltage High Vcom of the high subpixel and an optimal common voltage Low Vcom of the low subpixel are different from each other, a common voltage distortion ΔVcom is generated.

Accordingly, since an afterimage can be generated from this and a flicker phenomenon is then intensified, visibility may be deteriorated.

However, in the liquid crystal display according to the exemplary embodiment, the reference voltage applied through the reference voltage line which is connected with the third thin film transistor may be increased, thereby increasing a voltage Vb developed at the low subpixel.

Herein, the reference voltage may be higher than the common voltage applied to the common electrode and when the common voltage is 7V, the reference voltage Vr may be in the range of 8V to 11V.

Accordingly, the difference with the level of the common voltage high Vcom corresponding to the high subpixel is reduced by increasing the level of the common voltage Low Vcom corresponding to the low subpixel Therefore, the afterimage and flicker problems due to the common voltage distortion of the high subpixel and the low subpixel may be resolved with adjustment of the reference voltage Vr.

In the liquid crystal display according to another exemplary embodiment a voltage signal Vr applied to the reference voltage line may be swung.

When the reference voltage signal is swung, the level of the voltage applied to the low subpixel in the positive polarity mode is increased and the level of the voltage applied to the low subpixel in the negative polarity mode is decreased, thereby improving the transmittance.

At this time, when the level of the voltage applied to the reference voltage is higher than the level of the common voltage applied to the common electrode, the reference voltage signal may be swung.

At a result, since the kickback voltage of the low subpixel is decreased, it is possible that the flicker phenomenon is improved and the afterimage due to the common voltage distortion is minimized.

The reference voltage may include a signal having a duty ratio which is swung in the range of 50% to 80%.

Herein, the duty ratio is called a ratio of an off time and an on time of the reference voltage while the gate signal is turned on.

Hereinafter, a liquid crystal display according to another exemplary embodiment will be described with reference to FIGS. 14 and 15.

Figure 14:
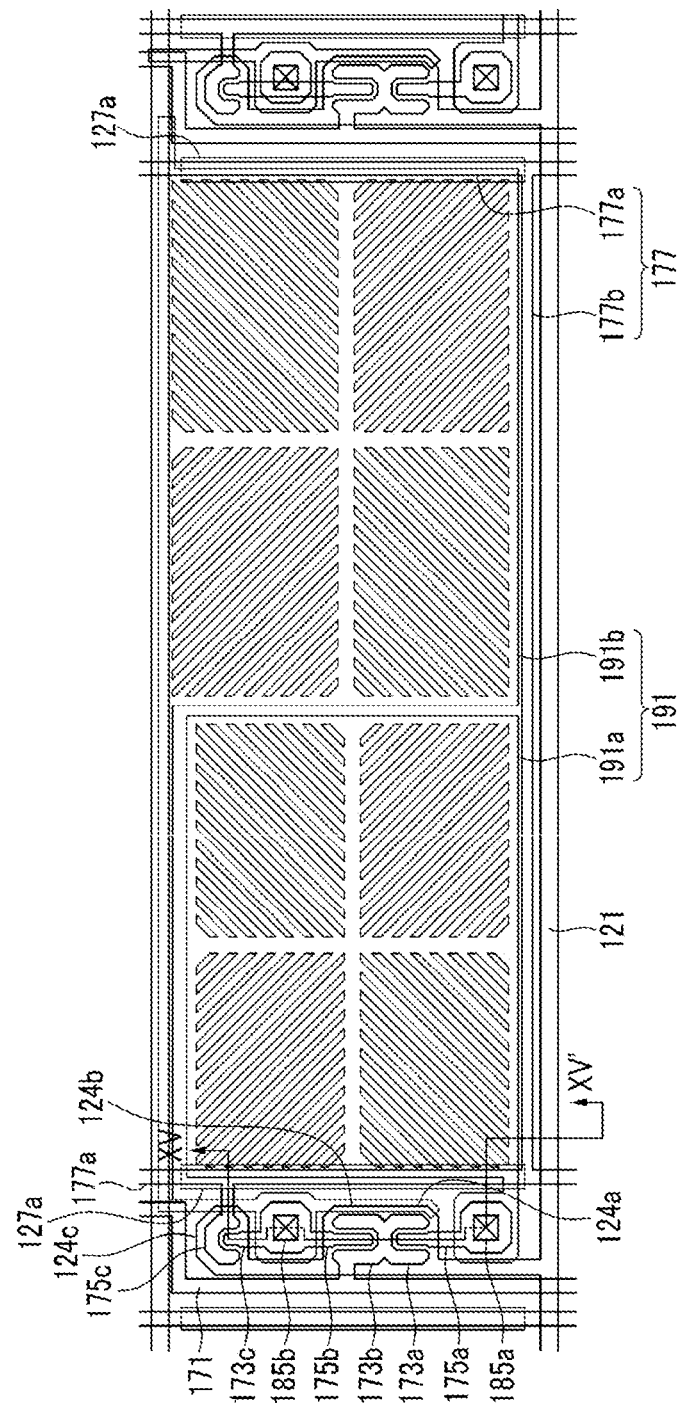
FIG. 14 is a layout view for one pixel of a liquid crystal display according to another exemplary embodiment.
Figure 15:
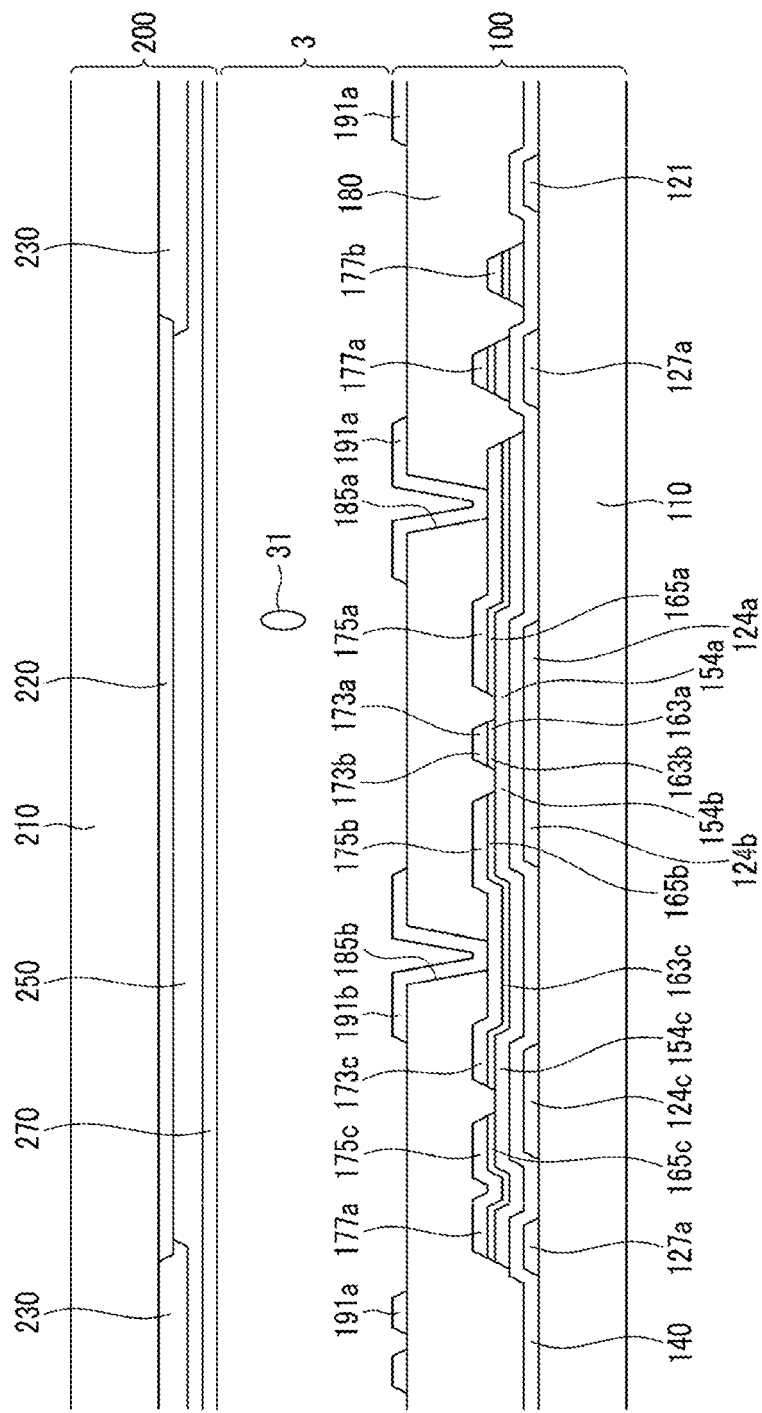
FIG. 15 is a cross-sectional view taken along line XV-XV' of FIG. 14.

FIG. 14 is a layout view (generally to scale) for one pixel unit or cell of a liquid crystal display according to the other exemplary embodiment and FIG. 15 is a cross-sectional view taken along line XV-XV' of FIG. 14.

Referring to FIGS. 14 and 15, the liquid crystal display according to the exemplary embodiment has a structure substantially similar (with some exceptions) to the structure of the liquid crystal display according to the exemplary embodiment shown in FIGS. 3 and 4.

Accordingly, a description of the similar parts will be omitted.

The liquid crystal display according to the exemplary embodiment further includes a second light blocking unit 127a disposed in the lower substrate below the vertical portion 177a of the reference voltage line 177 and formed on the same layer as the gate line 121, unlike the liquid crystal display according to the exemplary embodiment shown in FIGS. 3 and 4.

The light blocking unit 127a prevents the semiconductor 157 disposed below the vertical portion 177a of the reference voltage line 177 from being activated by light for example passed from the backlighting unit so as to thereby more stably maintain a voltage value applied to the reference voltage line 177.

Many characteristics of the liquid crystal display according to the exemplary embodiment shown in FIGS. 3 and 4 may be applied to the liquid crystal display according to the exemplary embodiment shown in FIGS. 14 and 15.

Hereinafter, a liquid crystal display according to yet another exemplary embodiment will be described with reference to FIGS. 16 and 17.

Figure 16:
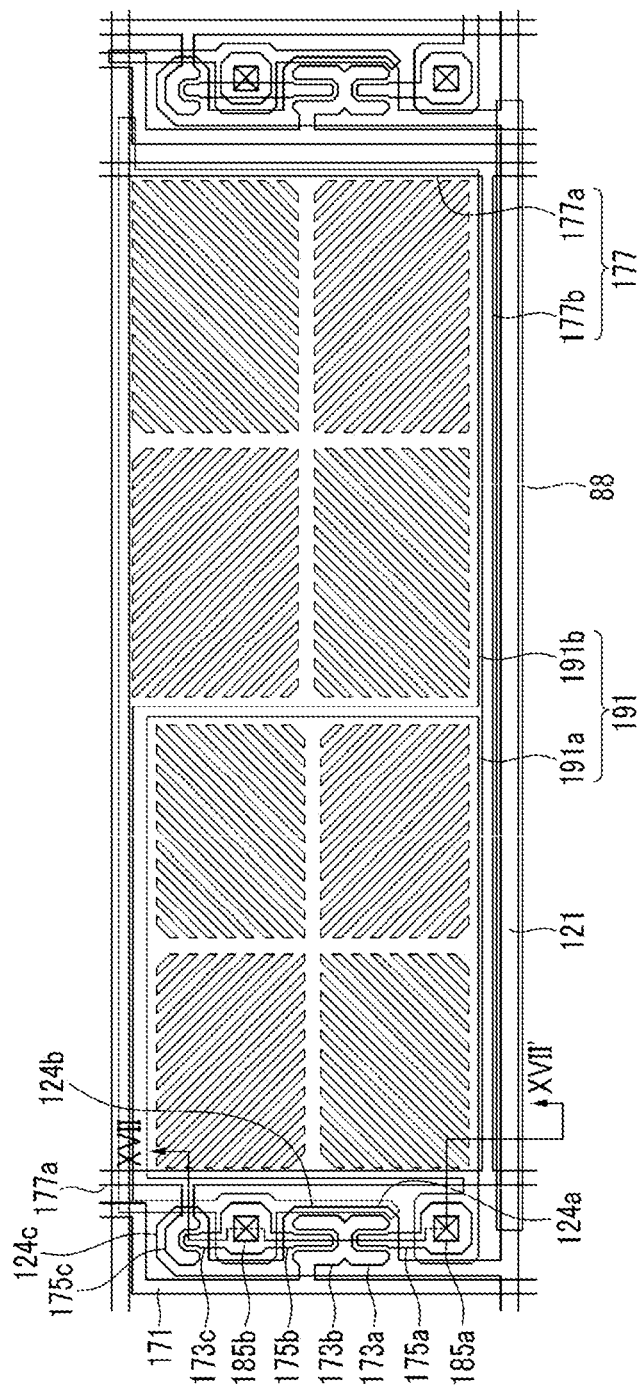
FIG. 16 is a layout view for one pixel of a liquid crystal display according to yet another exemplary embodiment.

FIG. 16 is a layout view for one pixel cell of a liquid crystal display according to yet another exemplary embodiment.

Figure 17:
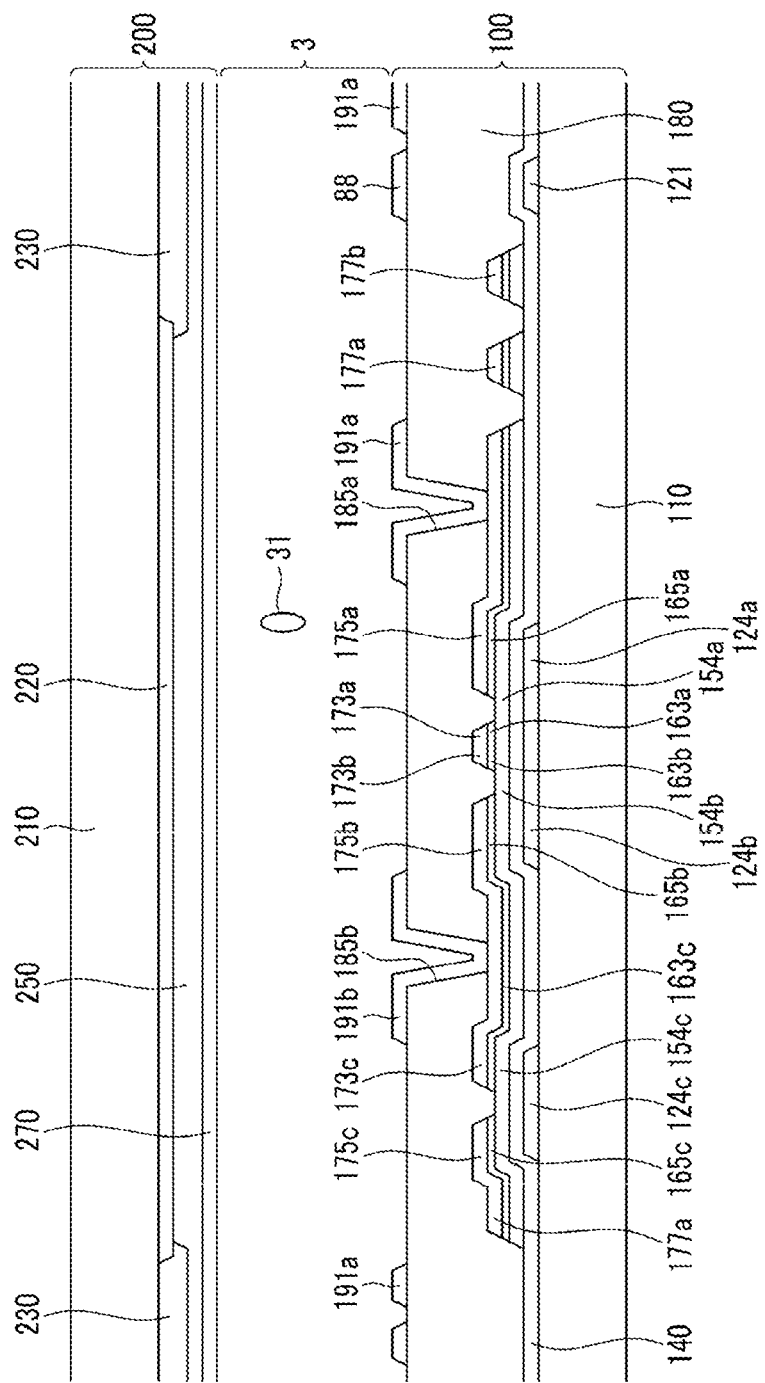
FIG. 17 is a cross-sectional view taken along line XVII-XVII' of FIG. 16.

FIG. 17 is a cross-sectional view taken along line XVII-XVII' of FIG. 16.

Referring to FIGS. 16 and 17, the liquid crystal display according to the exemplary embodiment has a structure similar to the structure of the liquid crystal display according to the exemplary embodiment shown in FIGS. 3 and 4.

Accordingly, a description of similar parts will be omitted.

The liquid crystal display according to the exemplary embodiment further includes a shielding electrode line 88 disposed on the lower substrate and over the gate line 121 and formed on the same layer as the pixel electrode 191, unlike the liquid crystal display according to the exemplary embodiment shown in FIGS. 3 and 4. The shielding electrode line 88 may be made of the same conductive material as that of the pixel-electrode.

The shielding electrode line 88 has a width larger than the gate line 121 to fully cover the gate line 121.

A voltage almost similar to the voltage applied to the common electrode 270 may be applied to the shielding electrode line 88 such that irregular movement of the liquid crystal molecules is prevented around the gate line 121 and it is thereby possible to prevent display quality deterioration such as from light leakage by the moved liquid crystal molecules.

As a variation to the embodiment shown in FIGS. 16 and 17, the liquid crystal display may include a shielding electrode (not shown) extended in a vertical direction by being protruded from the illustrated shielding electrode line 88 shown extended in a horizontal direction.

The shielding electrode may overlap a portion of the gate line connecting the gate electrodes 124a, 124b, and 124c in the gate line 121 extended in a horizontal direction.

Many characteristics of the liquid crystal display according to the exemplary embodiment shown in FIGS. 3 and 4 and the liquid crystal display according to the exemplary embodiment shown in FIGS. 14 and 15 may be applied to the liquid crystal display according to the exemplary embodiment shown in FIGS. 16 and 17.

Hereinafter, a liquid crystal display according to yet another exemplary embodiment will be described with reference to FIG. 18.

Figure 18:
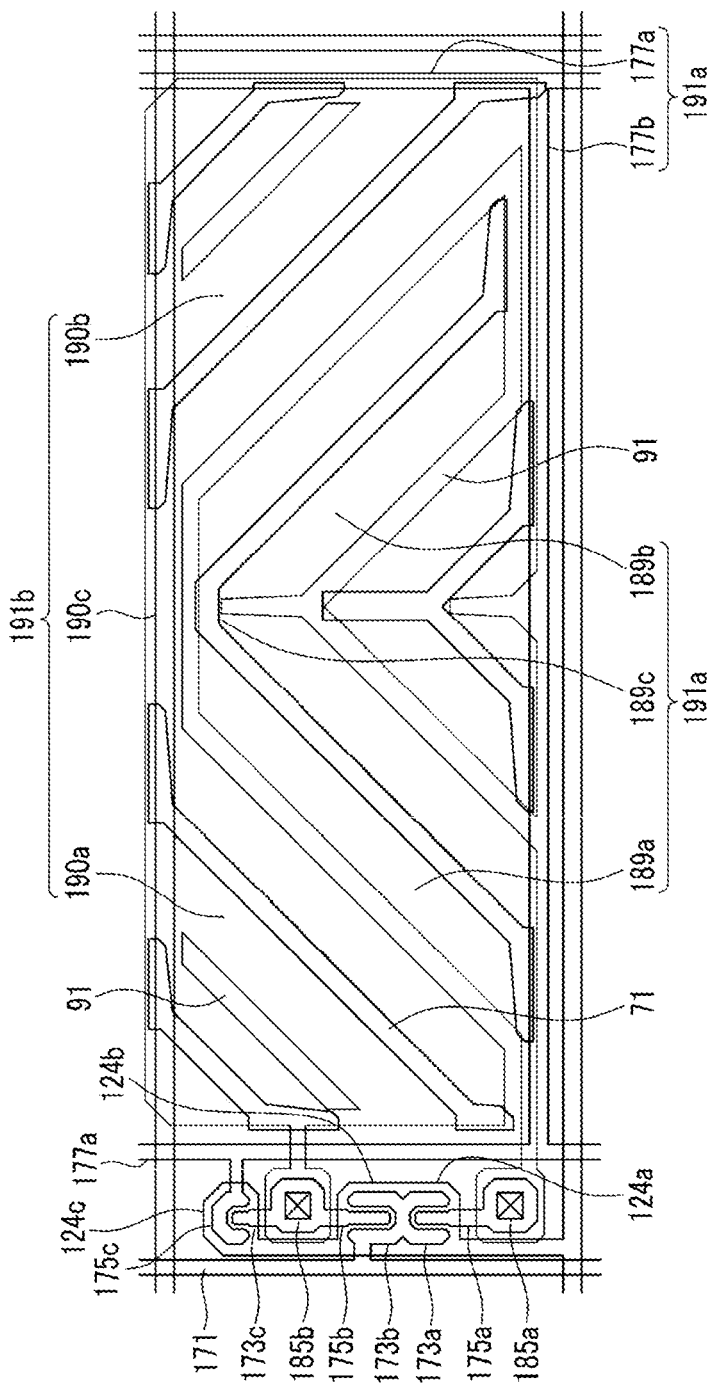
FIG. 18 is a layout view for one pixel of a liquid crystal display according to yet another exemplary embodiment.

FIG. 18 is a layout view for one pixel of a liquid crystal display according to yet another exemplary embodiment.

Referring to FIG. 18, the liquid crystal display according to the exemplary embodiment has a structure similar to the structure of the liquid crystal display according to the exemplary embodiment shown in FIGS. 3 and 4.

Accordingly, a description of similar parts will be omitted.

The liquid crystal display according to the exemplary embodiment is different from overall shapes of the first subpixel electrode 191a and the second subpixel electrode 191b of the liquid crystal display according to the exemplary embodiment shown in FIGS. 3 and 4.

In other words, the liquid crystal display according to the exemplary embodiment of FIG. 18 includes the first subpixel electrode 191a and the second subpixel electrode 191b divided into a plurality of regions by a first cutout 91.

The first subpixel electrode 191a divided by the first cutout 91 includes a first region 189a and a second region 189b extended along a tilted direction with respect to the gate line 121 and a connection bridge 189c connecting the first region 189a with the second region 189b.

Similarly, the second subpixel electrode 191b divided by the first cutout 91 includes a third region 190a and a fourth region 190b extended along a tilted direction with respect to the gate line 121 and a connection bridge 190c connecting the third region 190a with the fourth region 190b.

Portions of the first subpixel electrode 191a are surrounded by portions of the second subpixel electrode 191b.

The common electrode 270 formed on the upper display panel 200 may include a second cutout 71 corresponding to the first cutout 91.

The second cutout 71 is alternately arranged in position with respect to the first cutout 91.

The first subpixel electrode 191a and the second subpixel electrode 191b are physically and electrically connected with the first drain electrode 175a and the second drain electrode 175b through the contact holes 185a and 185b, respectively and receive the data voltage from the first drain electrode 175a and the second drain electrode 175b.

In this case, since a part of the data voltage applied the second drain electrode 175b is divided through the third source electrode 173c, a voltage applied to the second subpixel electrode 191b becomes smaller than a voltage applied to the first subpixel electrode 191a.

Many characteristics of the liquid crystal display according to the exemplary embodiment shown in FIGS. 3 and 4 may be adapted to the liquid crystal display according to the exemplary embodiment shown in FIG. 18.

Hereinafter, a liquid crystal display according to yet another exemplary embodiment will be described with reference to FIG. 19.

Figure 19:
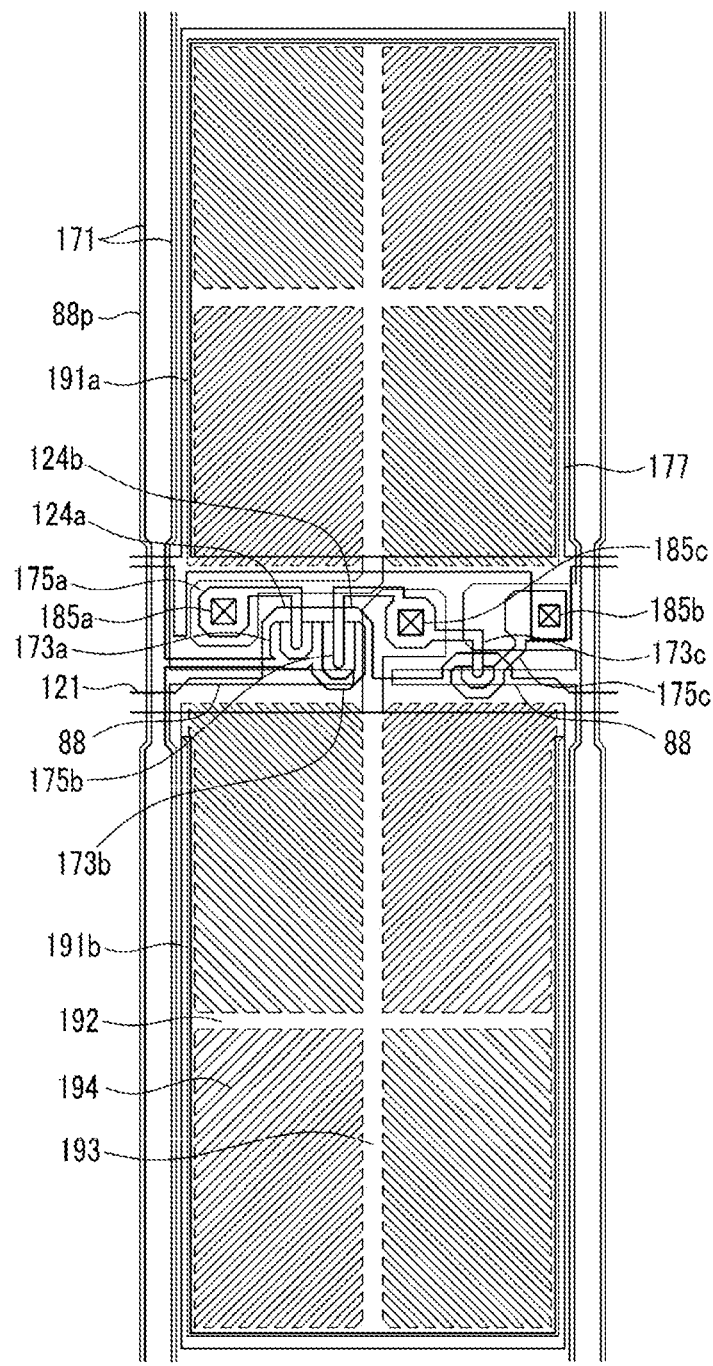
FIG. 19 is a layout view for one pixel of a liquid crystal display according to yet another exemplary embodiment.

FIG. 19 is a layout view (generally to scale) for one pixel cell of a liquid crystal display according to yet another exemplary embodiment.

Referring to FIG. 19, the liquid crystal display according to the exemplary embodiment has a structure similar to the structure of the liquid crystal display according to the exemplary embodiment shown in FIGS. 3 and 4.

However, in the exemplary embodiment of FIG. 19 the three transistors (Qa, Qb, Qc) are disposed in the middle of the pixel-electrode where the pixel electrode has a vertically long form, unlike the exemplary embodiment shown in FIGS. 3 and 4 including the pixel electrode having the horizontally long form.

In other words, the pixel electrode 191 of the exemplary embodiment includes the first subpixel electrode 191a on one side of the three transistors (Qa, Qb, Qc) and the second subpixel electrode 191b on the other side and the outline of the pixel electrode 191 includes a first side parallel to the gate line 121 and a second side parallel to the data line 171.

The first side parallel to the gate line 121 is shorter than the second side parallel to the data line 171.

As explained, the first thin film transistor Qa, the second thin film transistor Qb, and the third thin film transistor Qc are positioned between the first subpixel electrode 191a and the second subpixel electrode 191b.

Herein, a connection structure of the first thin film transistor Qa, the second thin film transistor Qb, and the third thin film transistor Qc is substantially similar to that of the exemplary embodiment described in FIGS. 1, 3, and 4.

However, the reference voltage line 177 is positioned on the same layer as the gate line 121 and may be physically and electrically connected through the contact hole 185c of the gate insulating layer 140 which is interposed between the reference voltage line 177 and the data conductors 171, 173c, 175a, 175b, and 175c.

The liquid crystal display according to the exemplary embodiment includes a shielding electrode line 88p extended in parallel along the data line 171.

The shielding electrode line 88p may be formed on the same layer as the pixel electrode 191 on the data line 171 and includes a shielding electrode 88 protruded in a direction which the gate line 121 is extended.

The shielding electrode 88 may be overlapped with an edge portion of the gate line 121.

Herein, the shielding electrode 88 is separated from the pixel electrode 191, particularly, the second subpixel electrode 191*b*.

Hereinafter, a liquid crystal display according to yet another exemplary embodiment will be described with reference to FIG. 20.

Figure 20:
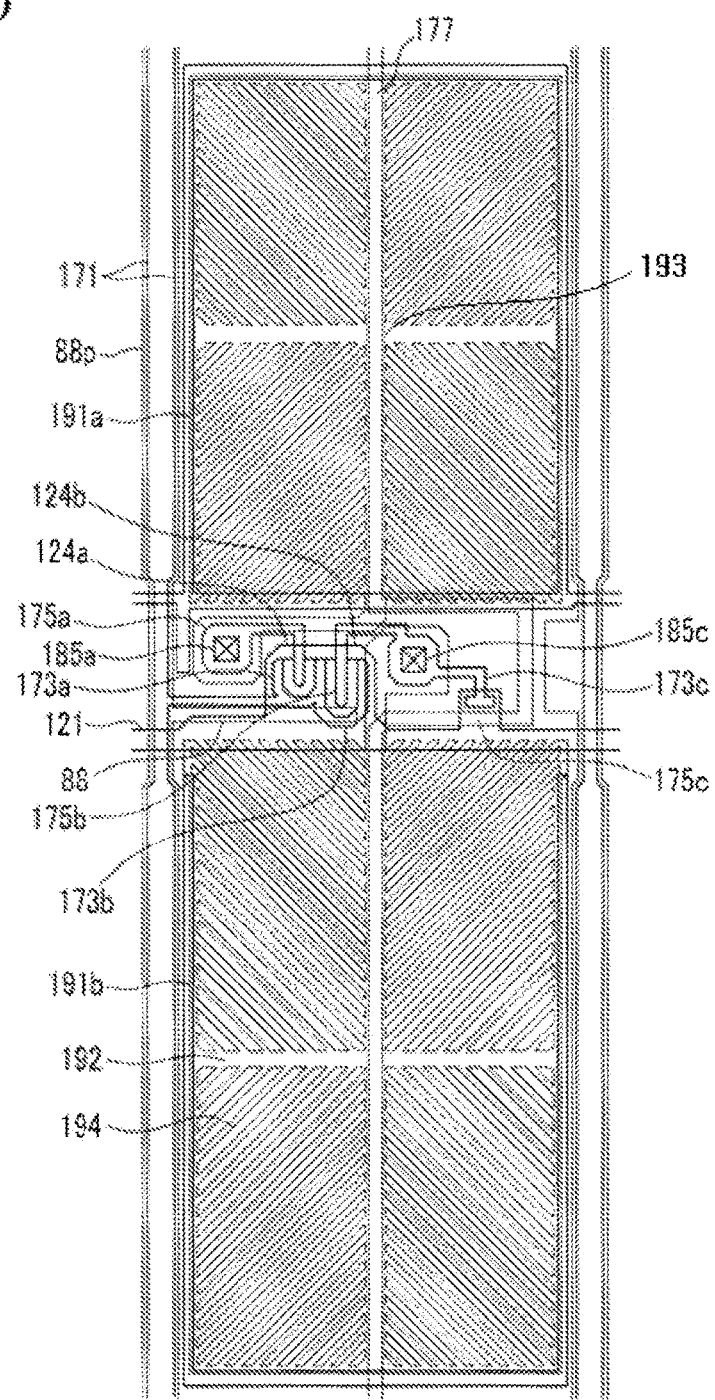
FIG. 20 is a layout view for one pixel of a liquid crystal display according to yet another exemplary embodiment.

FIG. 20 is a layout view for one pixel of a liquid crystal display according to yet another exemplary embodiment of the present invention.

Referring to FIG. 20, the liquid crystal display according to the exemplary embodiment is substantially similar to the structure of the liquid crystal display according to the exemplary embodiment shown in FIG. 19, but is different from the overall shapes of the reference voltage line 177.

In other words, the liquid crystal display according to the exemplary embodiment includes the reference voltage line 177 extending along an extending direction of the vertical stem 193 of the subpixel electrodes 191*a*, 191*b*. The reference voltage line 177 overlaps the vertical stem 193. But, the reference voltage line 177 goes around not to intersect the second thin film transistor.

The reference voltage line 177 includes the third drain electrode 175*c* (an output terminal of the third thin film transistor) facing a large end portion of the third source electrode 173*c* (an input terminal of the third thin film transistor).

The reference voltage line 177 is disposed at a same layer as the data line 171. Therefore, the liquid crystal display according to the exemplary embodiment need not form a contact hole 185*b* as in the exemplary embodiment shown in FIG. 19.

Figure 21:
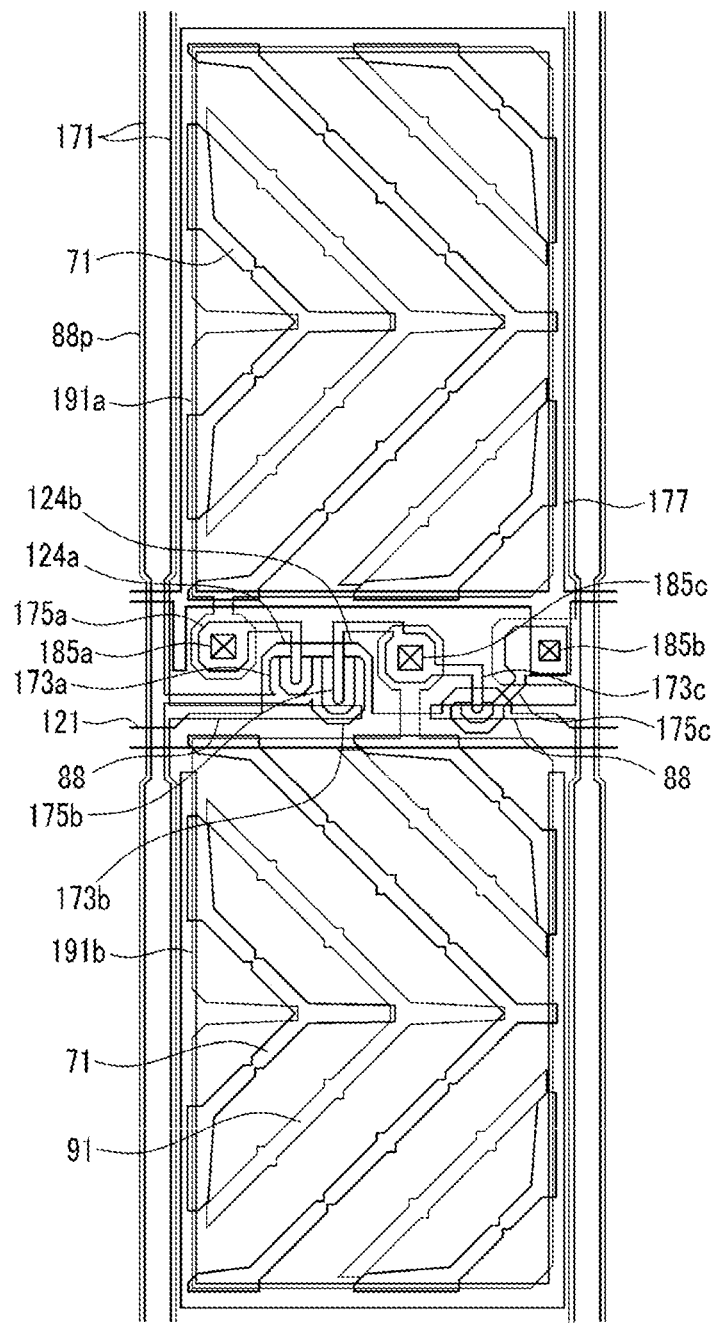
FIG. 21 is a layout view for one pixel of a liquid crystal display according to yet another exemplary embodiment.

FIG. 21 is a layout view for one pixel of a liquid crystal display according to yet another exemplary embodiment of the present invention.

Referring to FIG. 21, the liquid crystal display according to the exemplary embodiment is substantially similar to the structure of the liquid crystal display according to the exemplary embodiment shown in FIG. 19, but is different from the overall shapes of the first subpixel electrode 191*a* and the second subpixel electrode 191*b*.

In other words, the liquid crystal display according to the exemplary embodiment includes the first subpixel electrode 191*a* and the second subpixel electrode 191*b* divided into a plurality of regions by a first cutout 91.

The first subpixel electrode 191*a* divided by the first cutout 91 includes regions curved in a chevron shape.

Similarly, the second subpixel electrode 191*b* divided by the first cutout 91 includes regions curved in a chevron shape.

The shape and layout of the first subpixel electrode 191*a* and the second subpixel electrode 191*b* are not limited to the exemplary embodiment and may be modified.

The common electrode 270 formed on the upper display panel 200 includes the second cutout 71 and the second cutout 71 and the first cutout 91 are arranged alternately.

While the present disclosure of invention has been described in connection with a variety of what are presently considered to be practical exemplary embodiments, it is to be understood that the present teachings are not limited to the disclosed embodiments, but, on the contrary, is intended for the teachings to cover various modifications and equivalent arrangements included within the spirit and scope of the present disclosure.

What is claimed is:

1. A liquid crystal display, comprising:
a first substrate;
a second substrate facing the first substrate;
a liquid crystal layer interposed between the first substrate and the second substrate and including liquid crystal molecules;
a gate line disposed on the first substrate and including a gate electrode;
a data line disposed on the first substrate and crossing the gate line;
a first thin film transistor and a second thin film transistor connected to the gate line and the data line;
a third thin film transistor connected to the gate line and the second thin film transistor;
a reference voltage line connected to the third thin film transistor; and
a pixel electrode including a first subpixel electrode connected to the first thin film transistor and a second subpixel electrode connected to both the second thin film transistor and the third thin transistor,
wherein the gate electrode extends from the gate line and includes at least two expansion parts, and
wherein the reference voltage line comprises an output terminal of the third thin film transistor.

2. The liquid crystal display of claim 1, wherein:
the second thin film transistor is connected to the second subpixel electrode and the third thin film transistor.

3. The liquid crystal display of claim 1, wherein:
a voltage applied to the second subpixel electrode is lower than a voltage applied to the first subpixel electrode.

4. The liquid crystal display of claim 1, wherein:
an area of the second subpixel electrode is equal to or larger than an area of the first subpixel electrode.

5. The liquid crystal display of claim 1, wherein:
a ratio of the area of the first subpixel electrode and the area of the second subpixel electrode is in the range of about 1:1 to 1:2.

6. The liquid crystal display of claim 1, wherein:
when a ratio of a channel width versus a channel length of the second thin film transistor is called a first channel ratio and a ratio of a channel width versus a channel length of the third thin film transistor is called a second channel ratio,
a percentage of the first channel ratio with respect to the sum of the first channel ratio and the second channel ratio is in the range of about 70% to 80%.

7. The liquid crystal display of claim 1, wherein:
the pixel electrode includes a first side parallel to the gate line and a second side parallel to the data line,
wherein a length of the first side is longer than that of the second side.

8. The liquid crystal display of claim 7, wherein:
the first subpixel electrode and the second subpixel electrode each includes a cross-shaped stem having a horizontal stem and a vertical stem crossing the horizontal stem, and
a plurality of minute branches extending from the cross-shaped stem.

9. The liquid crystal display of claim 8, wherein:
the first subpixel electrode and the second subpixel electrode each includes a plurality of subregions having the plurality of minute branches extended toward different directions from the cross-shaped stem.

10. The liquid crystal display of claim 8, wherein:
the reference voltage line includes two vertical portions parallel to the data line and a horizontal portion connecting the vertical portions with each other.

11. The liquid crystal display of claim 10, wherein:
the vertical portion of the reference voltage line is disposed between the pixel electrode and the data line and the horizontal portion of the reference voltage line is disposed between the pixel electrode and the gate line.

12. The liquid crystal display of claim 11, further comprising:
a light blocking unit disposed below the vertical portion of the reference voltage line and formed on a same layer as the gate line.

13. The liquid crystal display of claim 12, further comprising:
a shielding electrode disposed on a same layer as the pixel electrode and overlapping the gate line.

14. The liquid crystal display of claim 8, wherein the reference voltage line extends along an extending direction of the vertical stem and overlaps the vertical stem.

15. The liquid crystal display of claim 1,
wherein each of the first subpixel electrode and the second subpixel electrode includes a first cutout, the common electrode includes a second cutout, and the first cutout and the second cutout arrange alternately.

16. The liquid crystal display of claim 1, wherein:
the pixel electrode includes a first side parallel to the gate line and a second side parallel to the data line,
wherein a length of the second side is longer than that of the first side.

17. The liquid crystal display of claim 1, wherein:
the gate line transfers a gate signal and gate signals applied to control terminals of the first thin film transistor, the second thin film transistor, and the third thin film transistor are simultaneously transferred.

18. The liquid crystal display of claim 1, wherein:
the liquid crystal molecules are vertically aligned while an electric field is not applied.

19. The liquid crystal display of claim 1, further comprising:
a shielding electrode line disposed along a direction which the data line is extended, wherein the shielding electrode line includes a shielding electrode protruded to overlap the gate line.

20. The liquid crystal display of claim 19, wherein:
the shielding electrode is separated from the second subpixel electrode.

21. The liquid crystal display of claim 1, wherein the first subpixel electrode and the second subpixel electrode are formed of a same material.

22. The liquid crystal display of claim 1, wherein the reference voltage line and the common electrode are respectively coupled to different reference voltage supply sources.

23. The liquid crystal display of claim 1, further comprising: a common electrode disposed on the second substrate, wherein the reference voltage line is isolated from the common electrode such that a magnitude of a reference voltage applied through the reference voltage line has a level higher than that of a common voltage applied to the common electrode.

24. The liquid crystal display of claim 1, wherein the reference voltage line is disposed at a same layer as the data line.

25. The liquid crystal display of claim 1, wherein both of the first subpixel electrode and the second subpixel electrode are formed of a light transmissive material.

26. The liquid crystal display of claim 1, wherein the connecting of the second subpixel electrode to both the second thin film transistor and the third thin transistor is such that a first subpixel region corresponding to the first subpixel electrode has a different transmittance from a second subpixel region corresponding to the second subpixel electrode.

27. A liquid crystal display, comprising:
a first substrate;
a second substrate facing the first substrate;
a liquid crystal layer interposed between the first substrate and the second substrate and including liquid crystal molecules;
a gate line disposed on the first substrate;
a data line disposed on the first substrate and crossing the gate line;
a first thin film transistor and a second thin film transistor connected to the gate line and the data line;
a third thin film transistor connected to the gate line and the second thin film transistor;
a reference voltage line connected to the third thin film transistor; and
a pixel electrode including a first subpixel electrode connected to the first thin film transistor and a second subpixel electrode connected to both the second thin film transistor and the third thin transistor,
wherein the reference voltage line includes two vertical portions parallel to the data line and a horizontal portion connecting the vertical portions with each other.

28. A liquid crystal display, comprising:
a first substrate;
a second substrate facing the first substrate;
a liquid crystal layer interposed between the first substrate and the second substrate and including liquid crystal molecules;
a gate line disposed on the first substrate;
a data line disposed on the first substrate and crossing the gate line;
a first thin film transistor and a second thin film transistor connected to the gate line and the data line;
a third thin film transistor connected to the gate line and the second thin film transistor;
a reference voltage line connected to the third thin film transistor; and
a pixel electrode including a first subpixel electrode connected to the first thin film transistor and a second subpixel electrode connected to both the second thin film transistor and the third thin transistor,
wherein a first source electrode of the first thin film transistor and a second source electrode of the second thin film transistor respectively have a "U" shaped structure, and the "U" shaped structure of the first source electrode and the "U" shaped structure of the second source electrode face toward different directions from each other.

29. The liquid crystal display of claim 28, wherein the first source electrode has a single body with the second source electrode.

30. The liquid crystal display of claim 28, wherein a third source electrode of the third thin film transistor has a "I" shaped end portion.

* * * * *